US009201246B2

(12) United States Patent
Mihara et al.

(10) Patent No.: US 9,201,246 B2
(45) Date of Patent: Dec. 1, 2015

(54) CONTROLLER, DISPLAY DEVICE, EYEGLASS DEVICE AND VIDEO SYSTEM FOR CONTROLLING AN EYEGLASS DEVICE BASED ON AN ENVIRONMENTAL FACTOR

(75) Inventors: Kazuhiro Mihara, Osaka (JP); Yoshio Umeda, Hyogo (JP); Seiji Nakazawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1039 days.

(21) Appl. No.: 13/237,226

(22) Filed: Sep. 20, 2011

(65) Prior Publication Data
US 2012/0007965 A1 Jan. 12, 2012

Related U.S. Application Data

(63) Continuation of application No. PCT/JP2011/000315, filed on Jan. 21, 2011.

(30) Foreign Application Priority Data

Jan. 22, 2010 (JP) ................................. 2010-011708

(51) Int. Cl.
H04N 13/04 (2006.01)
G02B 27/22 (2006.01)
G09G 3/00 (2006.01)

(52) U.S. Cl.
CPC ............ *G02B 27/2264* (2013.01); *G09G 3/003* (2013.01); *H04N 13/0438* (2013.01); *G09G 2320/0209* (2013.01); *G09G 2320/0247* (2013.01); *H04N 2213/008* (2013.01)

(58) Field of Classification Search
CPC . G02B 27/2264; G09G 3/003; H94N 13/0438
USPC .......................................................... 348/56
See application file for complete search history.

(56) References Cited

U.S. PATENT DOCUMENTS

| 5,325,192 | A | 6/1994 | Allen |
| 6,593,959 | B1 | 7/2003 | Kim et al. |
| 2002/0039230 | A1 | 4/2002 | Lin |
| 2010/0060723 | A1 | 3/2010 | Kimura et al. |
| 2011/0001808 | A1* | 1/2011 | Mentz et al. .................... 348/59 |

FOREIGN PATENT DOCUMENTS

| JP | 64-86694 | 3/1989 |
| JP | 7-336729 | 12/1995 |

(Continued)

OTHER PUBLICATIONS

International Search Report issued Mar. 1, 2011 in International (PCT) Application No. PCT/JP2011/000315.

*Primary Examiner* — Richard Torrente
(74) *Attorney, Agent, or Firm* — Wenderoth, Lind & Ponack, L.L.P.

(57) ABSTRACT

A controller for controlling an eyeglass device which performs an assistance operation for assisting in stereoscopically viewing a video includes: a first acquisition portion for acquiring first frequency information relating to a display frequency of frame images of the video; a second acquisition portion for acquiring second frequency information relating to an environmental factor which periodically varies in an environment where the video is viewed; and a generator for generating a reference signal to adapt the assistance operation of the eyeglass device to display of the frame image and periodic variation of the environmental factor on the basis of the first frequency information and the second frequency information.

13 Claims, 20 Drawing Sheets

(56) References Cited

FOREIGN PATENT DOCUMENTS

| JP | 8-43766 | 2/1996 |
| JP | 8-205204 | 8/1996 |
| JP | 9-9299 | 1/1997 |
| JP | 9-138384 | 5/1997 |
| JP | 9-322198 | 12/1997 |
| JP | 2002-107669 | 4/2002 |
| WO | 2008/056753 | 5/2008 |

* cited by examiner

FIG. 10

SECTION (A)

| START BIT (1) | TIMING FLAG (1) | SHUTTER OPEN/ CLOSED FLAG (1) | LEFT/RIGHT SHUTTER FLAG (1) | TRANSMITTANCE INFORMATION (2) | RESPONSE SPEED INFORMATION (2) | SHUTTER OPEN TIME INFORMATION (2) | PARITY BIT (1) |
|---|---|---|---|---|---|---|---|

SECTION (B)

| NAME OF BIT | NUMBER OF BITS | |
|---|---|---|
| START BIT | 1 | INDICATES START OF SYNCHRONOUS DATA |
| TIMING FLAG | 1 | SET TO 1 AT START OF OPEN/CLOSE TIMING AND OTHERWISE SET TO 0 |
| SHUTTER OPEN/ CLOSED FLAG | 1 | 0: CLOSE SHUTTER   1: OPEN SHUTTER |
| LEFT&RIGHT SHUTTER FLAG | 1 | 0: LEFT SHUTTER   1: RIGHT SHUTTER |
| TRANSMITTANCE INFORMATION | 2 | 00: TRANSMISSION RATE 25%   01: TRANSMISSION RATE 50%<br>10: TRANSMISSION RATE 75%   11: TRANSMISSION RATE 50% |
| RESPONSE SPEED INFORMATION | 2 | 00: RESPONSE SPEED SLOW   01: RESPONSE SPEED STANDARD<br>10: RESPONSE SPEED FAST |
| SHUTTER OPEN TIME INFORMATION | 2 | 00: SHUTTER OPEN TIME SHORT   01: SHUTTER OPEN TIME STANDARD<br>10: SHUTTER OPEN TIME LONG |
| PARITY BIT | 1 | INDICATES END OF SYNCHRONOUS DATA |

FIG. 11

| LIGHTING FREQUENCY | VIDEO FRAME RATE | COMBINED PERIOD | | |
|---|---|---|---|---|
| | | SYNCHRONIZATION PERIOD | BLINKING CYCLE | VIDEO DISPLAY CYCLE |
| 100Hz | 96Hz | 250ms | 25 | 12 |
| | 100Hz | 20ms | 2 | 1 |
| | 120Hz | 50ms | 5 | 3 |
| | 144Hz | 250ms | 25 | 18 |
| 120Hz | 196Hz | 41.6ms | 5 | 2 |
| | 100Hz | 100ms | 12 | 5 |
| | 120Hz | 16.6ms | 2 | 1 |
| | 144Hz | 41.6ms | 5 | 3 |

FIG. 14

SECTION (A)

| START BIT (1) | TIMING FLAG (1) | SHUTTER OPEN/ CLOSED FLAG (1) | LEFT/RIGHT SHUTTER FLAG (1) | LIGHTING FREQUENCY INFORMATION (2) | FRAME RATE INFORMATION (2) | PHASE DIFFERENCE INFORMATION (2) | PARITY BIT (1) |
|---|---|---|---|---|---|---|---|

SECTION (B)

| NAME OF BIT | NUMBER OF BITS | |
|---|---|---|
| START BIT | 1 | INDICATES START OF SYNCHRONOUS DATA |
| TIMING FLAG | 1 | SET TO 1 AT START OF OPEN/ CLOSE TIMING AND OTHERWISE SET TO 0 |
| SHUTTER OPEN/CLOSED FLAG | 1 | 0: CLOSE SHUTTER    1: OPEN SHUTTER |
| LEFT&RIGHT SHUTTER FLAG | 1 | 0: LEFT SHUTTER    1: RIGHT SHUTTER |
| LIGHTING FREQUENCY INFORMATION | 2 | 00: 100Hz    01: 120Hz |
| FRAME RATE INFORMATION | 2 | 00: 96Hz    01: 100Hz<br>10: 120Hz    11: 144Hz |
| PHASE DIFFERENCE INFORMATION | 2 | 00: 0 DEGREES    01: 90 DEGREES<br>10: 180 DEGREES    11: 270 DEGREES |
| PARITY BIT | 1 | INDICATES END OF SYNCHRONOUS DATA |

CONTROLLER, DISPLAY DEVICE, EYEGLASS DEVICE AND VIDEO SYSTEM FOR CONTROLLING AN EYEGLASS DEVICE BASED ON AN ENVIRONMENTAL FACTOR

This application is a Rule 1.53(b) Continuation of International Application No. PCT/JP2011/000315 with the International Filing Date of Jan. 21, 2011.

TECHNICAL FIELD

The present invention is related to technologies for allowing a viewer to view a video displayed by a display device with an eyeglass device.

BACKGROUND ART

A video system which provides a stereoscopically perceivable video image typically comprises a display device configured to alternately switch the display between a left video image created so as to be viewed by the left eye and a right video image created so as to be viewed by the right eye; and an eyeglass device, which assists in viewing the video to allow a viewer to stereoscopically perceive the video displayed by the display device. The eyeglass device typically comprises an optical shutter including a left shutter which increases and decreases a transmission light amount to the left eye and a right shutter which increases and decreases a transmission light amount to the right eye. The optical shutter is controlled so as to open and close in synchronism with switching of the video image, so that the viewer views the left video image with the left eye only and the right video image with the right eye only. Therefore the viewer stereoscopically perceives the video displayed by the display device.

An illumination device such as a fluorescent lamp typically blinks at a consistent frequency. According to Patent Document 1, if the aforementioned video system is used in a lighting environment in which the illumination device blinks at a consistent frequency, mismatching between the lighting frequency of the illumination device and the open/close control operation of the optical shutter in the eyeglass device causes flicker. The technologies disclosed in Patent Document 1 uses the blanking time period between frame images of a video displayed by the display device to adjust an open time period of the optical shutter of the eyeglass device.

However, it is still insufficient to suppress the flicker by means of the adjustment of the open time period of the optical shutter according to the technologies disclosed in Patent Document 1.

Patent Document 1: Japanese Patent Application Publication No. H9-138384

SUMMARY OF THE INVENTION

It is an object of the present invention to provide technologies for controlling operation of an eyeglass device in response to an environment where a video is viewed.

A controller for controlling an eyeglass device configured to perform an assistance operation for assisting in stereoscopically viewing a video according to one aspect of the present invention includes: a first acquisition portion configured to acquire first frequency information relating to a display frequency of frame images of the video; a second acquisition portion configured to acquire second frequency information relating to an environmental factor which periodically varies in an environment where the video is viewed; and a generator configured to generate a reference signal for adapting the assistance operation of the eyeglass device to display of the frame image and periodic variation of the environmental factor based on the first frequency information and the second frequency information.

A display device according to another aspect of the present invention includes: a display portion configured to display a video which is stereoscopically perceived; and a controller configured to control an eyeglass device which performs an assistance operation for assisting in viewing the video, wherein the controller includes: a first acquisition portion configured to acquire first frequency information relating to a display frequency of frame images of the video; a second acquisition portion configured to acquire second frequency information relating to an environmental factor that periodically varies in an environment where the video is viewed; and a generator configured to generate a reference signal for adapting the assistance operation of the eyeglass device to display of the frame image and periodic variation of the environmental factor based on the first frequency information and the second frequency information.

An eyeglass device configured to perform an assistance operation for assisting in stereoscopically viewing a video according to yet another aspect of the present invention has: a receiver configured to receive a reference signal generated based on first frequency information relating to a display frequency of frame images of the video and second frequency information relating to an environmental factor which periodically varies in an environment where the video is viewed; and an optical filter portion configured to perform the assistance operation adapted to display of the frame image and periodic variation of the environmental factor in response to the reference signal.

A video system according to yet another aspect of the present invention includes: a display device configured to display a video which is stereoscopically perceived; and an eyeglass device configured to perform an assistance operation for assisting in viewing the video, wherein the display device includes: a display portion configured to display the video; and a controller configured to control the eyeglass device, the controller includes: a first acquisition portion configured to acquire first frequency information relating to a display frequency of frame images of the video; a second acquisition portion configured to acquire second frequency information relating to an environmental factor which periodically varies in an environment where the video is viewed; and a generator configured to generate a reference signal for adapting the assistance operation of the eyeglass device to display of the frame image and periodic variation of the environmental factor based on the first frequency information and the second frequency information; and the eyeglass device comprises: a receiver configured to receive the reference signal; and an optical filter portion configured to perform the assistance operation adapted to the display of the frame image and the periodic variation of the environmental factor in response to the reference signal.

BRIEF DESCRIPTION OF THE DRAWINGS

FIG. 10 is a chart showing a format of a synchronization signal transmitted by the transmitter and control information included in the synchronization signal.

FIG. 11 is a chart showing a combination of a lighting frequency of the fluorescent lamp and a frame rate of the video image.

FIG. 14 is a chart showing a format of the synchronization signal shown in FIG. 13 and control information included in the synchronization signal.

DESCRIPTION OF THE INVENTION

Figure 1:
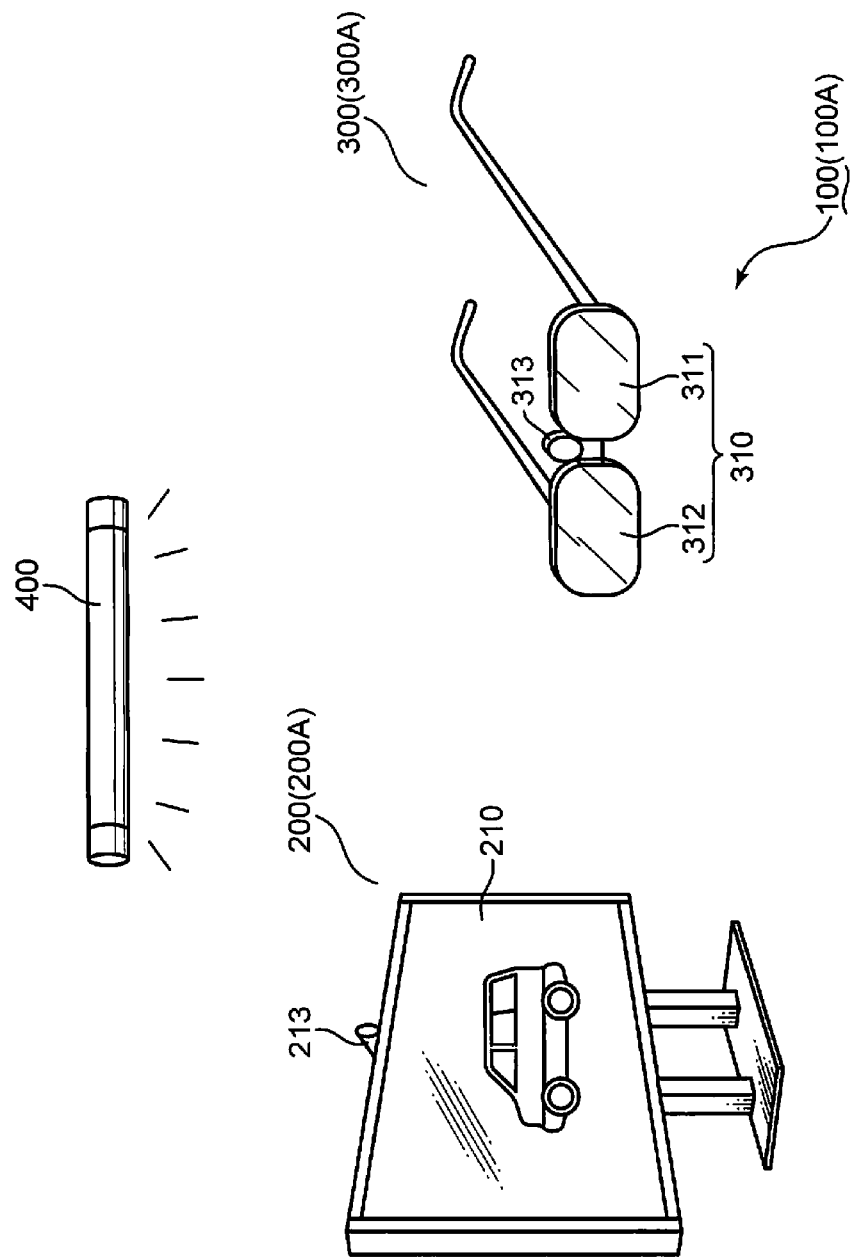
FIG. 1 is a schematic view of a video system according to one embodiment.

The controller, the display device, the eyeglass device and the video system according to one embodiment are described with reference to the accompanying drawings hereinafter. Configurations, arrangements, shapes and alike shown in the drawings and descriptions relating to the drawings are merely intended to facilitate understanding of principles of the controller, the display device, the eyeglass device and the video system, and do not limit in any way the principles of the controller, the display device, the eyeglass device and the video system.

First Embodiment

Configuration of Video System

FIG. 1 is a schematic view of a video system according to the first embodiment. The video system is described with reference to FIG. 1.

The video system 100 comprises a display device 200 which displays a video to be stereoscopically perceived, and an eyeglass device 300 which performs an assistance operation for assisting in viewing the video displayed by the display device 200. If a viewer wears the eyeglass device 300 to view the video displayed by the display device 200, the viewer may stereoscopically perceive the video.

The display device 200 comprises a display panel 210 configured to display the video to be stereoscopically perceived. The video displayed on the display panel 210 includes a left frame image (referred as an L frame image hereinafter) which is created so as to be viewed by the left eye, and a right frame image (referred as an R frame image hereinafter) which is created so as to be viewed by the right eye. The display device 200 alternately displays the L and R frame images on the display panel 210, for example, at a frequency of 120 Hz. In the present embodiment, the display panel 210 is exemplified as the display portion. Information relating to the display frequency of the L and R frame images (in the present embodiment, 120 Hz) is exemplified as the first frequency information.

The eyeglass device 300 looks like eyeglasses for correcting eyesight. The eyeglass device 300 comprises an optical shutter portion 310 which performs the assistance operation to assist in viewing the video so that the video displayed by the display device 200 is stereoscopically perceived by the viewer. The optical shutter portion 310 comprises a left shutter 311 which is situated in front of the left eye of a viewer wearing the eyeglass device 300, and a right shutter 312 which is situated in front of the viewer's right eye. If the left shutter 311 is opened, an incident light amount to the left eye via the left shutter 311 increases. If the left shutter 311 is closed, the incident light amount to the left eye via the left shutter 311 decreases. If the right shutter 312 is opened, an incident light amount to the right eye via the right shutter 312 increases. If the right shutter 312 is closed, the incident light amount to the right eye via the right shutter 312 decreases. In the description hereinafter, the incident light amount to the viewer's eyes via the optical shutter portion 310 is referred as the "transmission light amount". In the present embodiment, the optical shutter portion 310 is exemplified as the optical filter portion. The left shutter 311 is exemplified as the left filter. The right shutter 312 is exemplified as the right filter. Another optical element configured to adjust transmission light amount may be used as the left and/or right filters. A polarizing element which polarizes light transmitted to the viewer's left and right eyes (for example, a liquid crystal filter) may be used as the left and/or right filters.

The display device 200 further comprises a controller (to be described later), which controls the eyeglass device 300. In the present embodiment, the controller is integrally incorporated into the display device 200. Alternatively, the controller may be separately provided from a display element configured to display a video and externally installed on the display device.

The controller synchronizes the aforementioned assistance operation of the optical shutter portion 310 with display of the L and R frame images on the display panel 210. The optical shutter portion 310 increases the transmission light amount to the left eye and decreases the transmission light amount to the right eye during the display of the L frame image under the control of the controller. On the other hand, the optical shutter portion 310 decreases the transmission light amount to the left eye and increases the transmission light amount to the right eye during the display of the R frame image under the control of the controller. As a result, the viewer may view the L frame images with the left eye only and the R frame images with the right eye only.

The L and R frame images represent different contents by parallax amount. The viewer perceives pseudo-parallax on the basis of the L frame image which is viewed by the left eye only and the R frame image which is viewed by the right eye only. As a result, the viewer stereoscopically perceives the video displayed by the display device 200. While the eyeglass device 300 suitably performs the assistance operation under the control of the controller, the viewer may perceive objects depicted in the video as if they are protruded out from or pulled into the display screen of the display panel 210.

FIG. 1 shows a video system 100 used in a space which is illuminated by the fluorescent lamp 400. In the present embodiment, the space illuminated by the fluorescent lamp 400 is exemplified as the environment where the video is viewed. The fluorescent lamp 400 is exemplified as the illumination light source.

The fluorescent lamp 400 periodically repeats blinking in accordance with the AC frequency of the commercial power supply, which is used as a power source to the fluorescent lamp 400. In the present embodiment, the blinking of the fluorescent lamp 400 is exemplified as the environmental factor. The information relating to the blinking frequency of the fluorescent lamp 400, which corresponds to the AC frequency of the commercial power source, is exemplified as the second frequency information.

A video signal is input to the display device 200. The display device 200 processes the video signal to output a stereoscopic video image (3D video) to the display panel 210. The display device 200 further comprises a light emitter 213, which is used as a transmitter configured to transmit a synchronization signal in order to cause the eyeglass device 300 to perform the aforementioned assistance operation in synchronism with the display of the video image. In the present embodiment, the light emitter 213 emits infrared light. Alternatively, the transmitter may also output anther type of signal for transmitting control information to the eyeglass device. For example, the transmitter may transmit a radio signal instead of an infrared signal.

In the present embodiment, the assistance operation of the eyeglass device 300 is controlled and adapted to the blinking of the fluorescent lamp 400 as well as the display of the L and R frame images. The synchronization signal transmitted from the light emitter 213 includes a reference signal used for adapting the assistance operation of the eyeglass device 300 to the display of the L and R frame images and the blinking of the fluorescent lamp 400. The synchronization signal also includes a control signal used for causing the eyeglass device 300 to perform the assistance operation so that the viewer perceives reduced brightness variation of the fluorescent lamp 400. As described hereinafter, in the present embodiment, the reference signal also serves as the control signal.

The eyeglass device 300 also comprises a light receiver 313, which is used as a receiver configured to receive the aforementioned synchronism signal. The light receiver 313 receives the infrared light output by the light emitter 213. Alternatively, the receiver may be a receiving element which receives another type of signal. For example, the receiver may receive a radio signal instead of an infrared signal.

The optical shutter portion 310 performs the assistance operation, which is adapted to the display of the L and R frame images and the blinking of the fluorescent lamp 400, on the basis of the reference signal and the control signal, which are included in the synchronization signal. The left shutter 311 opens in synchronism with a start of an L frame image display and closes in synchronism with an end of the L frame image display, so that the viewer's left eye perceives a substantially consistent light amount from the fluorescent lamp 400. The right shutter 312 opens in synchronism with a start of an R frame image display and closes in synchronism with an end of the R frame image display, so that the viewer's right eye perceives a substantially consistent light amount from the fluorescent lamp 400. Accordingly variation in incident light amount from the fluorescent lamp 400 to the left eye while video image light from the L frame image is incident on the left eye, and variation in incident light amount from the fluorescent lamp 400 to the right eye while video image light from the R frame image is incident on the right eye, are appropriately reduced.

As a result of the aforementioned assistance operation of the optical shutter portion 310, the viewer wearing the eyeglass device 300 may stereoscopically perceive a video displayed by the display device 200 with little flicker caused by blinking of the fluorescent lamp 400.

In the present embodiment, the display frequency of the L and R frame images is 120 Hz. Alternatively, the display frequency of the L and R frame images may be another value such as 96 Hz, 100 Hz or 144 Hz. The display frequency of the L and R frame images is preferably determined in accordance with a source of video image to be displayed.

As described above, in the present embodiment, the video system 100 is used in a space which is illuminated by a fluorescent lamp 400. The methodologies of the video system 100 according to the present embodiment described below may also be used to moderate effects from other environmental factors which periodically change in an environment where the video is viewed.

Figure 2:
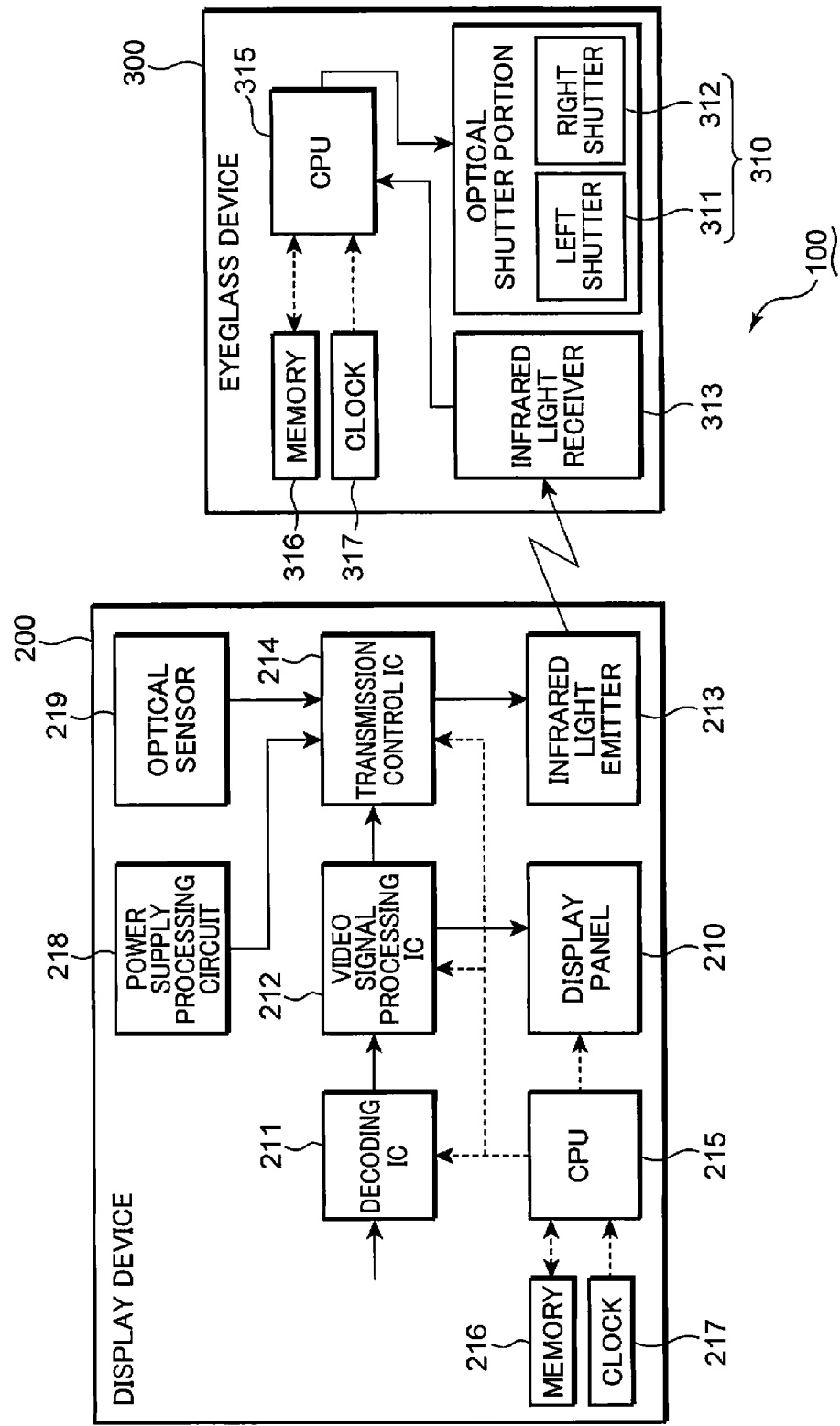
FIG. 2 is a block diagram schematically showing a hardware configuration of the video system depicted in FIG. 1.

FIG. 2 is a block diagram schematically showing a hardware configuration of the video system 100. The hardware configuration of the video system 100 is described with reference to FIGS. 1 and 2.

The display device 200 comprises a decoding IC 211, a video signal processing IC 212, a transmission control IC 214, a CPU 215, a memory 216, a clock 217, a power supply processing circuit 218 and an optical sensor 219 in addition to the display panel 210 and the light emitter 213, which are described above.

An encoded video signal is input to the decoding IC 211. The decoding IC 211 then decodes the input video signal to output video data in a prescribed format. MPEG (Motion Picture Experts Group)-2, MPEG-4 and H264 are exemplified as video encoding methodologies.

The video signal processing IC 212 processes the video signal in order to display the video data from the decoding IC 211 as a stereoscopic video image. In the present embodiment, the video signal processing IC 212 detects left and right video images from the video signal, which has been decoded by the decoding IC 211. Thereupon, the video signal processing IC 212 alternately arranges left and right video images in a time series. Alternatively, the video signal processing IC 212 may automatically generate left and right video images from the video signal output by the decoding IC 211. Further alternatively, the video signal processing IC 212 may carry out other signal processes related to stereoscopic video image display. The video signal processing IC 212 then generates an output signal, which is adapted to a signal input format of the display panel 210.

The video signal processing IC 212 may also carry out other signal processes, in addition to the aforementioned signal processes. For instance, the video signal processing IC 212 may adjust coloration of the video image displayed in accordance with characteristics of the display panel 210. The video signal processing IC 212 may interpolate images between the video image frames generated by the decoding IC 211 to increase the frame rate of the video image. The video signal processing IC 212 carries out the aforementioned signal processes to acquire the first frequency information relating to the display frequency of the L and R frame images. In the present embodiment, the video signal processing IC 212 is exemplified as the first acquisition portion.

The transmission control IC 214 generates a synchronization signal, which is synchronized with the left and right video images generated by the video signal processing IC 212, and outputs the synchronization signal to the light emitter 213 in response to a signal input from the power supply processing circuit 218 and/or the optical sensor 219, which are described below.

The CPU 215 controls various elements of the display device 200 such as the decoding IC 211 and the video signal processing IC 212, so that the CPU 215 controls the overall operation of the display device 200. The CPU 215 executes the aforementioned control, for example, in accordance with a program recorded in the memory 216 and inputs from external devices (not shown).

The memory 216 is used as a region for recording a program, which is executed by the CPU 215, and temporal data, which is generated during the execution of the program. A volatile RAM (Random Access Memory) or non-volatile ROM (Read Only Memory) is exemplified as the memory 216.

The clock 217 generates and supplies a clock signal to the CPU 215 and other constituent elements. The clock signal is used as an operational reference for various ICs and the other constituent elements of the display device 200.

The display panel 210 includes a display surface which displays a video signal output by the video signal processing IC 212 as a video image. For example, a CRT display, a liquid crystal display, a PDP (plasma display panel), an organic electroluminescence display or another device configured to display video images may be used as the display panel 210.

The light emitter 213 transmits an infrared beam, which is output as the synchronization signal, to the eyeglass device 300 under control of the transmission control IC 214.

The power supply processing circuit 218 generates a DC current from the AC current, which is input from the commercial power supply outside the display device 200. The power supply processing circuit 218 may detect a frequency of the input AC voltage. The frequency of the AC voltage from the commercial power supply is typically 50 Hz or 60 Hz. Therefore in the present embodiment, the power supply processing circuit 218 detects a frequency of 50 Hz or 60 Hz. Alternatively, the power supply processing circuit 218 may detect another frequency.

The optical sensor 219 detects a light condition in a space where the video system 100 is situated. In the present embodiment, the video system 100 is situated in the space which is illuminated by the fluorescent lamp 400, so that the optical sensor 219 detects a lighting frequency of the fluorescent lamp 400.

Typically, the lighting frequency of the fluorescent lamp 400 is greatly dependent on the frequency of the AC voltage supplied to the fluorescent lamp 400. For example, if an AC voltage of 50 Hz is supplied to the fluorescent lamp 400, the fluorescent lamp 400 repeats blinking at a frequency of 100 Hz, as a result of the AC current regulation. If an AC voltage of 60 Hz is supplied to the fluorescent lamp 400, the fluorescent lamp 400 repeats blinking at a frequency of 120 Hz, as a result of the AC current regulation. The optical sensor 219 detects the lighting frequency of the fluorescent lamp 400 (100 Hz or 120 Hz). In the present embodiment, information relating to the lighting frequency (blinking frequency) of the fluorescent lamp 400 and/or the frequency of the AC voltage of the commercial power supply is exemplified as the second frequency information. The optical sensor 219 and/or the power supply processing circuit 218 are exemplified as the second acquisition portion, which acquires the second frequency information.

The information relating to the display frequency of the L and R frame images acquired by the video signal processing IC 212 is output to the transmission control IC 214. Information relating to the frequency of the AC voltage acquired by the power supply processing circuit 218 and/or information relating to the lighting frequency of the fluorescent lamp 400 acquired by the optical sensor 219 are also output to the transmission control IC 214. The transmission control IC 214 generates a synchronization signal including a reference signal and a control signal on the basis of information relating to the display frequency, information relating to the frequency of the AC voltage and/or information relating to the lighting frequency of the fluorescent lamp 400. In the present embodiment, the transmission control IC 214 is exemplified as the generator. The video signal processing IC 212, the power supply processing circuit 218, the optical sensor 219 and the light emitter 213 are exemplified as the controller, which controls the eyeglass device 300.

In the present embodiment, synchronization control between the display device 200 and the eyeglass device 300 is achieved by means of a synchronization signal as an infrared beam. Alternatively, another type of transmission methodologies such as a wired signal, a wireless signal or an ultrasonic signal may be used to achieve the synchronized control between the display device and the eyeglass device.

The eyeglass device 300 comprises a CPU 315, a memory 316 and a clock 317, in addition to the optical shutter portion 310 and the light receiver 313, which are described above.

The CPU 315 controls overall operation of the eyeglass device 300, for example, in accordance with a program recorded in the memory 316 as well as the synchronization signal from the display device 200. The CPU 315 analyzes the synchronization signal received by the light receiver 313 to control the optical shutter portion 310 on the basis of the analysis results. In the present embodiment, the CPU 315 is exemplified as the analyzer.

The memory 316 stores data for a program executed by the CPU 315. The memory 316 is used as a region in which temporal data is recorded while the CPU 315 executes a program.

The clock 317 supplies a clock signal to various elements of the eyeglass device 300. The clock signal is used as a reference for operation of the various elements of the eyeglass device 300. The clock signal may be divided or multiplied, as appropriate.

The light receiver 313 is exemplified as the receiver, which receives a synchronization signal transmitted by the light emitter 213 of the display device 200. In the present embodiment, the light receiver 313 receives an infrared signal. Alternatively, if the display device transmits a wireless signal as the synchronization signal, the receiver is provided with elements required to receive the wireless signal such as an antenna or a tuner, instead of the light receiver 313. If a suitable receiving element is used as the receiver in accordance with a type of the synchronization signal for achieving the synchronized control between the display device and the eyeglass device, similar control to the synchronized control between the display device 200 and the eyeglass device 300 described in the context of the present embodiment may be achieved.

The optical shutter portion 310 comprises the left shutter 311 which is situated in front of the left eye of a viewer wearing the eyeglass device 300, and the right shutter 312 which is situated in front of the viewer's right eye. The left and right shutters 311, 312 open and close, respectively, to adjust the incident light to the left and right eyes. The optical shutter portion 310 appropriately adjusts the incident light to the left and right eyes under control of the CPU 315, which results in desired optical effects on the viewer wearing the eyeglass device 300.

The hardware configuration of the video system 100 shown in FIG. 2 is no more than one example. For instance, instead of various ICs, such as the decoding IC 211 and the video signal processing IC 212, an integrated IC with functions of these ICs may be used. Programmed processes executed by the CPU 215 may be performed by elements, such as a PLD (Programmable Logic Device) or a DSP (Digital Signal Processor). The various control procedures described in the context of FIG. 2 may be achieved by software (a program), for example which is executed by a CPU, rather than by hardware.

In the present embodiment, the display device 200 comprises the light emitter 213. Alternatively, the transmission control IC and the light emitter may be incorporated into a controller which is separately provided from an element which displays a video image. The controller may generate a synchronization signal to output the synchronization signal to the eyeglass device on the basis of input information (for example, the aforementioned first and second frequency information) from the display device, which displays video images.

Figure 3:
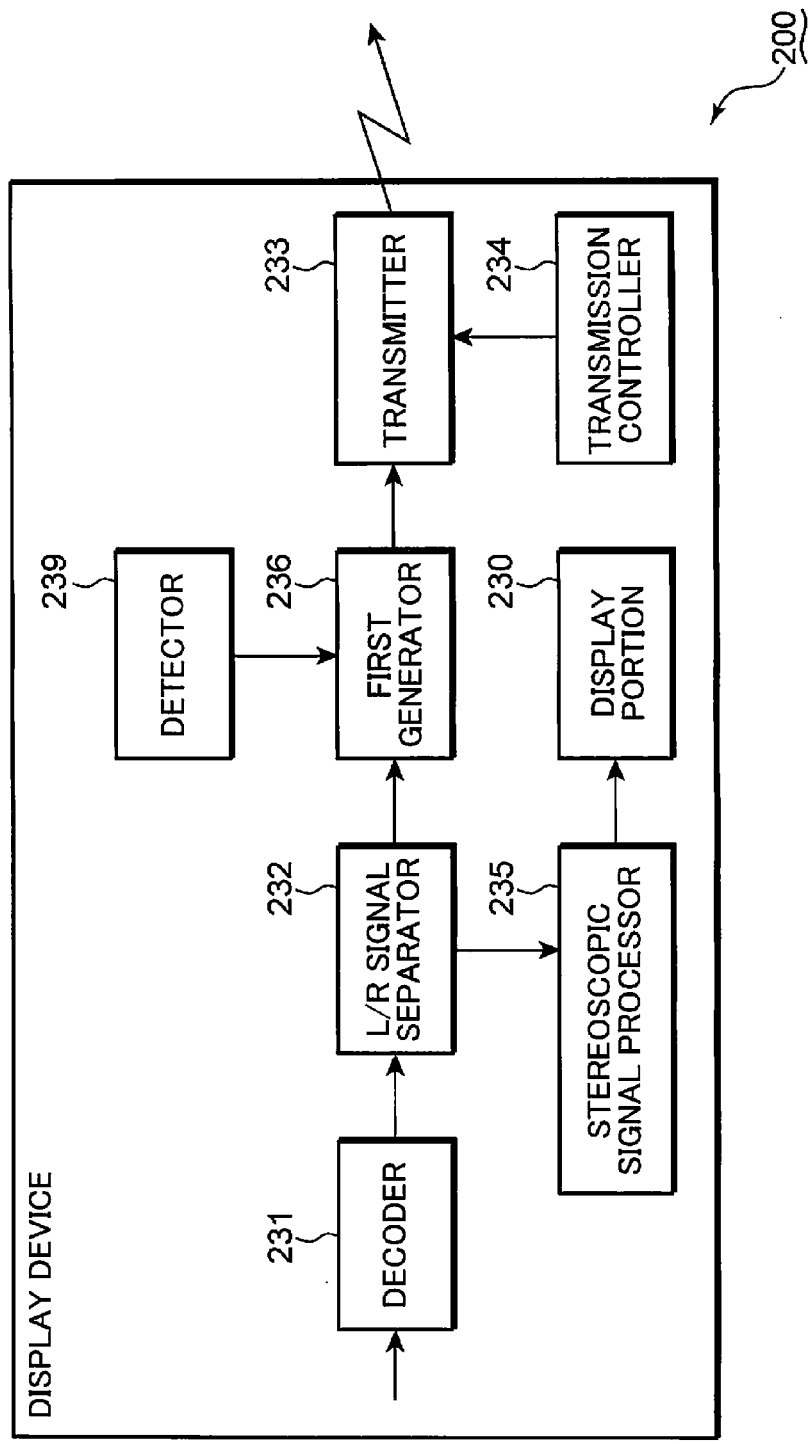
FIG. 3 is a block diagram schematically showing a functional configuration of a display device of the video system depicted in FIG. 1.

FIG. 3 is a block diagram schematically showing a functional configuration of the display device 200. The display device 200 is described with reference to FIGS. 1 to 3.

The display device 200 comprises a decoder 231, an L/R signal separator 232, a stereoscopic signal processor 235, a display portion 230, a first generator 236, a transmission controller 234, a transmitter 233 and a detector 239.

An encoded video signal is input to the decoder 231. The decoder 231 decodes the input video signal. The decoder 231 corresponds to the decoding IC 211 in the hardware configuration described in the context of FIG. 2.

The L/R signal separator 232 generates or separates left and right video signals from the video signal decoded by the decoder 231. The L/R signal separator 232 generates or separates the left and right video signals, so that the L/R signal separator 232 acquires information relating to the display frequency of the video image frames, and then outputs the information to the first generator 236. In the present embodiment, the L/R signal separator 232 is exemplified as the first acquisition portion.

The stereoscopic signal processor 235 adjusts the left and right video signals, which have been separated by the L/R signal separator 232, for example, in accordance with characteristics of the display portion 230. The stereoscopic signal processor 235 may adjust a parallax amount between the L and R frame images, for example, in accordance with size of the display surface of the display portion 230.

The first generator 236 generates a synchronization signal, which is synchronized to the left and right video images generated by the L/R signal separator 232. The first generator 236 adjusts a type and generation timing of the synchronization signal on the basis of the characteristics of the display portion 230, information relating to the display frequency of the video image frames output from the L/R signal separator 232 and information relating to the lighting frequency of the fluorescent lamp 400 output from the detector 239. In the present embodiment, the first generator 236 is exemplified as the generator. The generation of the synchronization signal by the first generator 236 is described below.

The L/R signal separator 232, the stereoscopic signal processor 235 and the first generator 236 correspond to the video signal processing IC 212 in the hardware configuration described in the context of FIG. 2.

The display portion 230 displays the video signal processed by the stereoscopic signal processor 235 as a video image. The display portion 230 corresponds to the display panel 210, in the hardware configuration described in the context of FIG. 2.

The transmission controller 234 adjusts data volume of the synchronization signal which is transmitted by the transmitter 233. Optionally, the transmission controller 234 controls a transmission interval of the synchronization signal to make the transmitter 233 intermittently transmit the synchronization signals. The transmission controller 234 corresponds to the transmission control IC 214, in the hardware configuration described in the context of FIG. 2.

The transmitter 233 transmits the synchronization signal, which has been generated by the first generator 236, to the eyeglass device 300 under control of the transmission controller 234. The transmitter 233 corresponds to the light emitter 213 in the hardware configuration described in the context of FIG. 2.

The detector 239 detects frequency information relating to an environmental factor which periodically varies in an environment where the display device 200 is situated. In the present embodiment, the display device 200 is situated in the space which is illuminated by the fluorescent lamp 400, so that the detector 239 detects the lighting frequency of the fluorescent lamp 400. The detector 239 corresponds to the power supply processing circuit 218 and/or the optical sensor 219 in the hardware configuration described in the context of FIG. 2. In the present embodiment, the detector 239 is exemplified as the second acquisition portion.

Figure 4:
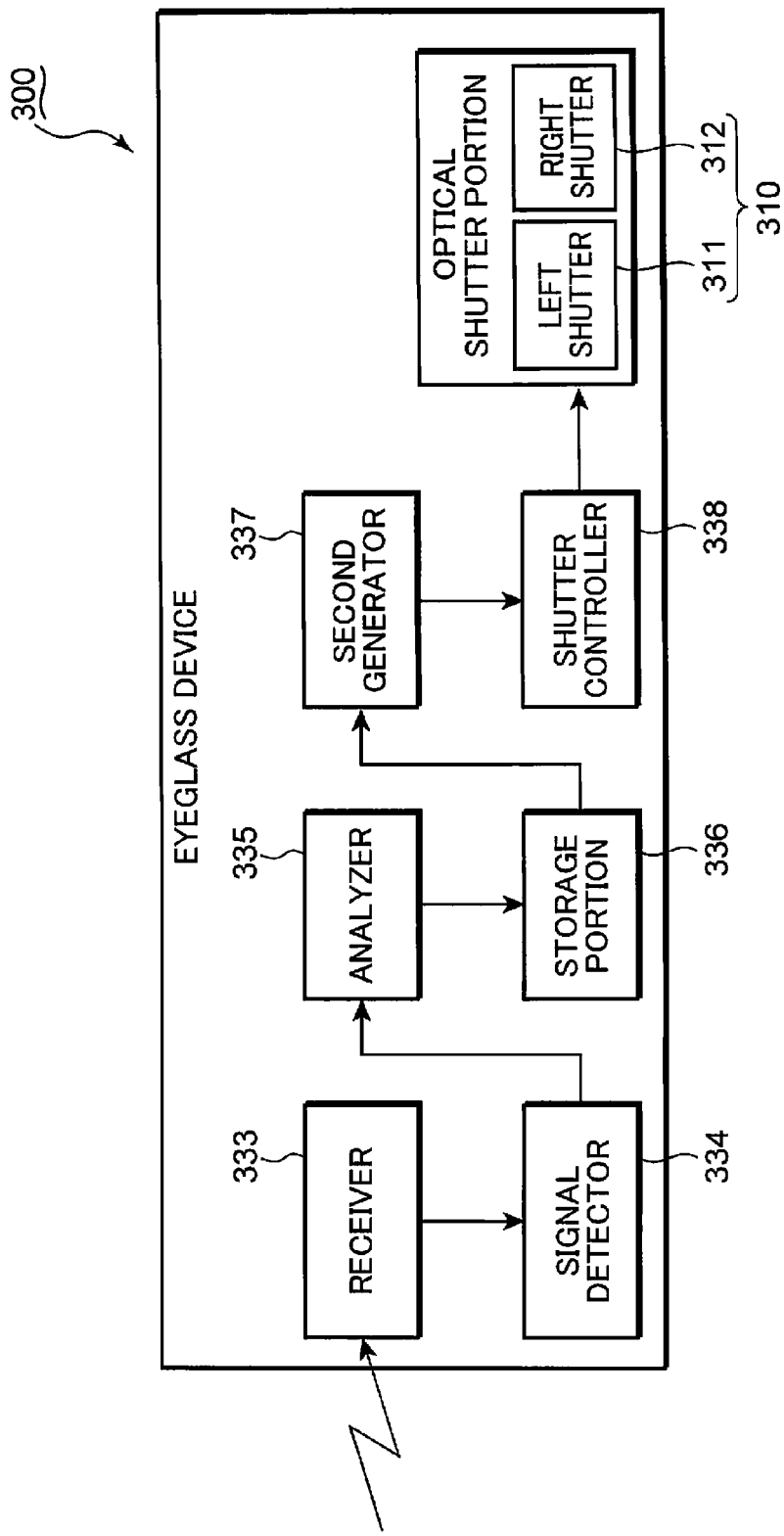
FIG. 4 is a block diagram schematically showing a functional configuration of an eyeglass device of the video system depicted in FIG. 1.

FIG. 4 is a block diagram schematically showing a functional configuration of the eyeglass device 300. The eyeglass device 300 is described with reference to FIGS. 1 to 4.

The eyeglass device 300 comprises a receiver 333, a signal detector 334, an analyzer 335, a storage portion 336, a second generator 337 and a shutter controller 338, in addition to the aforementioned optical shutter portion 310.

The receiver 333 receives the synchronization signal, which has been transmitted by the display device 200 using the infrared beam. The receiver 333 generates an electrical signal in response to the received infrared beam. The generated electrical signal is output to the signal detector 334 (described below). As described in the context of the hardware configuration in FIG. 2, in the present embodiment, the infrared signal is used as the synchronization signal. Alternatively, a signal other than the infrared signal may be used as the synchronization signal. For example, a radio signal may be communicated between the display device and the eyeglass device.

As described above, the receiver 333 receives the infrared signal (synchronization signal) and generates the electrical signal (synchronization signal) in response to the infrared signal. The signal detector 334 detects the synchronization signal from the electrical signal output from the receiver 333. For example, the signal detector 334 detects the electrical signal with a particular signal waveform as the synchronization signal.

The analyzer 335 analyzes the synchronization information, such as a time interval for operating the optical shutter portion 310 in response to the synchronization signal detected by the signal detector 334. For example, the analyzer 335 may acquire information relating to the opening/closing timings of the left and right shutters 311, 312 by means of the analysis of the synchronization information.

The signal detector 334 and the analyzer 335 correspond to a part of the program executed by the CPU 315 in the hardware configuration described in the context of FIG. 2.

The storage portion 336 stores and saves control information relating to operation of the optical shutter portion 310, which has been analyzed by the analyzer 335 in response to the synchronization signal. The storage portion 336 corresponds to the memory 316 in the hardware configuration described in the context of FIG. 2. In the hardware configuration described in the context of FIG. 2, the CPU 315 stores control information relating to the operation of the optical shutter portion 310 in the memory 316.

The second generator 337 generates an internal signal for controlling the operation of the optical shutter portion 310 on the basis of the synchronization information recorded in the storage portion 336. Alternatively, the second generator 337 generates an internal signal for controlling the operation of the optical shutter portion 310 on the basis of synchronization information (for example, the time interval for operating the optical shutter portion 310) analyzed by the analyzer 335. The second generator 337 corresponds to the CPU 315 and the clock 317 in the hardware configuration described in the context of FIG. 2.

The shutter controller 338 controls the operation of the left and right shutters 311, 312 in response to the internal signal generated by the second generator 337. According to the specific control executed by the shutter controller 338, which is described below, the shutter controller 338 adjusts timings, at which the left shutter 311 opens and/or 311 closes, so that decreased variation in illumination light amount from the fluorescent lamp 400 is transmitted to the left eye. The shutter controller 338 adjusts timings, at which the right shutter 312 opens and/or closes, so that decreased variation in illumination light amount of the fluorescent lamp 400 is transmitted to the right eye. According to another control executed by the shutter controller 338, the shutter controller 338 adjusts a transmittance of the left shutter 311 while the left shutter 311 is open, so that decreased variation in illumination light amount from the fluorescent lamp 400 is transmitted to the left eye. The shutter controller 338 adjusts a transmittance of the right shutter 312 while the right shutter 312 is open, so that decreased variation in illumination light amount of the fluorescent lamp 400 is transmitted to the right eye. According to yet another control executed by the shutter controller 338, the shutter controller 338 adjusts a response speed of the left shutter 311, so that decreased variation in illumination light amount from the fluorescent lamp 400 is transmitted to the left eye. The shutter controller 338 adjusts a response speed of the right shutter 312, so that decreased variation in illumination light amount of the fluorescent lamp 400 is transmitted to the right eye. The shutter controller 338 corresponds to a control program for the optical shutter portion 310, which is executed by the CPU 315 in the hardware configuration described in the context of FIG. 2. Alternatively, the shutter controller 338 may correspond to a driver (not shown) for driving the optical shutter portion 310.

The optical shutter portion 310 comprises the left shutter 311 in front of the left eye of a viewer wearing the eyeglass device 300, and a right shutter 312 in front of the viewer's right eye. In the present embodiment, the optical shutter portion 310 is exemplified as the optical filter portion. Another optical element may be used as the optical filter portion. For example, an optical element configured to adjust transmission light amount or transmitted light polarization may be suitably used as the optical filter portion. The optical element used for the optical filter portion may comprise, for example, a liquid crystal element. The liquid crystal element is controlled in order to adjust the transmission light amount.

In the present embodiment, the display portion 230 of the display device 200 alternately switches display between L and R frame images. Correspondingly, the left and right shutters 311, 312 alternately increase and decrease the transmission light amount. The optical filter portion may change deflection directions of light toward the left and right eyes instead of the aforementioned shutter operation. An optical element configured to adjust the transmitted light in synchronism with the switching of the video images displayed by the display device is suitably used as the optical filter portion.

The methodologies of the present embodiment are described here by means of a functional configuration which is shown in FIGS. 3 and 4, but the methodologies of the present embodiment are not limited to the functional configuration in FIGS. 3 and 4. In the present embodiment, the transmitter 233 and the display portion 230 are incorporated into one display device 200. Alternatively, the controller which transmits the synchronization signal for controlling the eyeglass device 300 may be separately provided from the display device comprising the display element which displays the video images.

The correspondence between the hardware and functional configurations described in the context of FIGS. 2 to 4 is no more than one example for clarifying the principles of the present embodiment. Therefore, the principles of the present embodiment are not limited to the correspondence between the hardware and functional configurations described in the context of FIGS. 2 to 4. Consequently, the controller, the display device, the eyeglass device and the video system may also have other hardware and functional configurations.

<Synchronization between Display Device and Eyeglass Device>

Figure 5:
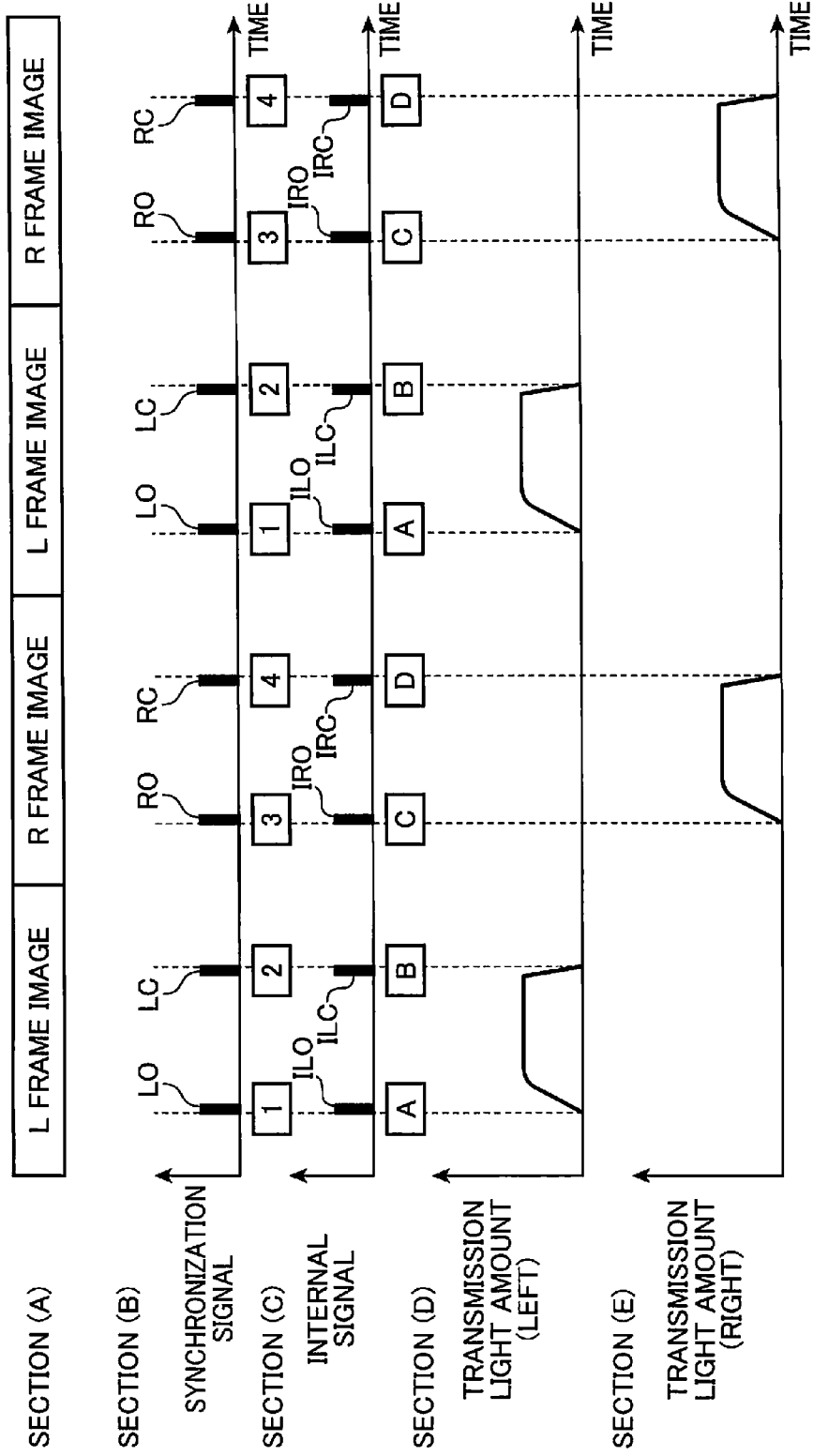
FIG. 5 is a timing chart schematically showing operational synchronization between the display device and the eyeglass device.

FIG. 5 is a timing chart schematically showing operational synchronization between the display device 200 and the eyeglass device 300. The synchronized control between the display device 200 and the eyeglass device 300 is described with reference to FIG. 1 and FIGS. 3 to 5. In order to clarify the synchronized control methodologies between the display device 200 and the eyeglass device 300, the synchronized control shown in FIG. 5 does not take account of blinking of the fluorescent lamp 400. Synchronized control which takes account of the blinking of the fluorescent lamp 400 is described further later.

Section (A) in FIG. 5 shows a frame image displayed by the display portion 230. As show in section (A) in FIG. 5, the display portion 230 alternately displays L and R frame images. In the present embodiment, the display portion 230 switches the L and R frame images at a frequency of 120 Hz. Therefore, the L and R frame images are displayed at a display frequency of 60 Hz, respectively.

Section (B) in FIG. 5 is a timing chart, which shows a synchronization signal generated by the first generator 236 of the display device 200. As described above, the synchronization signal is transmitted to the eyeglass device 300 by the transmitter 233. The synchronization signal includes pulse signals LO, LC, RO, RC. The pulse signal LO includes first command information for increasing a transmission light amount to the viewer's left eye. The pulse signal LC includes second command information for decreasing the transmission light amount to the viewer's left eye. The pulse signal RO includes third command information for increasing a transmission light mount to the viewer's right eye. The pulse signal RC includes fourth command information for decreasing the transmission light amount to the viewer's right eye. In the present embodiment, the pulse signals LO, LC, RO, RC are exemplified as control signals for causing the eyeglass device 300 to perform the assistance operation, respectively.

The transmitter 233 transmits the pulse signal LO in synchronization with a start of the L frame image display to open the left shutter 311 in synchronization with the start of the L frame image display, so that the transmission light amount to the viewer's left eye increases. The transmitter 233 then transmits the pulse signal LC in synchronization with the end of the L frame image display to close the left shutter 311 in synchronization with the end of the L frame image display, so that the transmission light amount to the viewer's left eye decreases. The transmitter 233 then transmits the pulse signal RO in synchronization with the start of the R frame image display to open the right shutter 312 in synchronization with the start of the R frame image display, so that the transmission light amount to the viewer's right eye increases. The transmitter 233 then transmits the pulse signal RC in synchronization with the end of the R frame image display to close the right shutter 312 in synchronization with the end of the R frame image display, so that the transmission light amount to the viewer's right eye decreases.

Section (C) in FIG. 5 is a timing chart which shows an internal signal generated by the second generator 337 of the eyeglass device 300. As described above, the second generator 337 generates the internal signal in response to the synchronization signal received by the receiver 333.

The second generator 337 generates a pulse signal ILO in response to the pulse signal LO. The shutter controller 338 controls the optical shutter portion 310 so that the left shutter 311 opens in response to the pulse signal ILO. The second generator 337 generates a pulse signal ILC in response to the pulse signal LC. The shutter controller 338 controls the optical shutter portion 310 so that the left shutter 311 closes in response to the pulse signal ILC. The second generator 337 generates a pulse signal IRO in response to the pulse signal RO. The shutter controller 338 controls the optical shutter portion 310 so that the right shutter 312 opens in response to the pulse signal IRO. The second generator 337 generates a pulse signal IRC in response to the pulse signal RC. The shutter controller 338 controls the optical shutter portion 310 so that the right shutter 312 closes in response to the pulse signal IRC.

Section (D) in FIG. 5 is a timing chart showing variation in transmission light amount to the left eye. Section (E) in FIG. 5 is a timing chart showing variation in transmission light amount to the right eye. As described above, the variation in transmission light amount is caused by the opening/closing operation of the left and right shutters 311, 312.

As described above, the pulse signal LO is transmitted in synchronization with the start of the L frame image display. The pulse signal ILO, which is used for the control to open the left shutter 311, is generated in response to the pulse signal LO. Consequently, the left shutter 311 opens in synchronization with the start of the L frame image display, so that the transmission light amount to the left eye starts to increase in synchronization with the start of the L frame image display.

As described above, the pulse signal LC is transmitted in synchronization with the end of the L frame image display. The pulse signal ILC, which is used for the control to close the left shutter 311, is generated in response to the pulse signal LC, so that the left shutter 311 closes in synchronization with the end of the L frame image display. Accordingly, the transmission light amount to the left eye starts to decrease in synchronization with the end of the L frame image display.

As described above, the pulse signal RO is transmitted in synchronization with the start of the R frame image display. The pulse signal IRO, which is used for the control to open the right shutter 312, is generated in response to the pulse signal RO. Consequently, the right shutter 312 opens in synchronization with the start of the R frame image display, so that the transmission light amount to the right eye starts to increase in synchronization with the start of the R frame image display.

As described above, the pulse signal RC is transmitted in synchronization with the end of the R frame image display. The pulse signal IRC, which is used for the control to close the right shutter 312, is generated in response to the pulse signal RC. Consequently, the right shutter 312 closes in synchronization with the end of the R frame image display, so that the transmission light amount to the right eye starts to decrease in synchronization with the end of the R frame image display.

The optical shutter portion 310 of the eyeglass device 300 is subjected to the control in response to the synchronization signal generated by the first generator 236 of the display device 200, so that the left and right shutters 311, 312 open and close, respectively, in synchronization with the L and R frame image display.

<Principles of Flicker>

Figure 6:
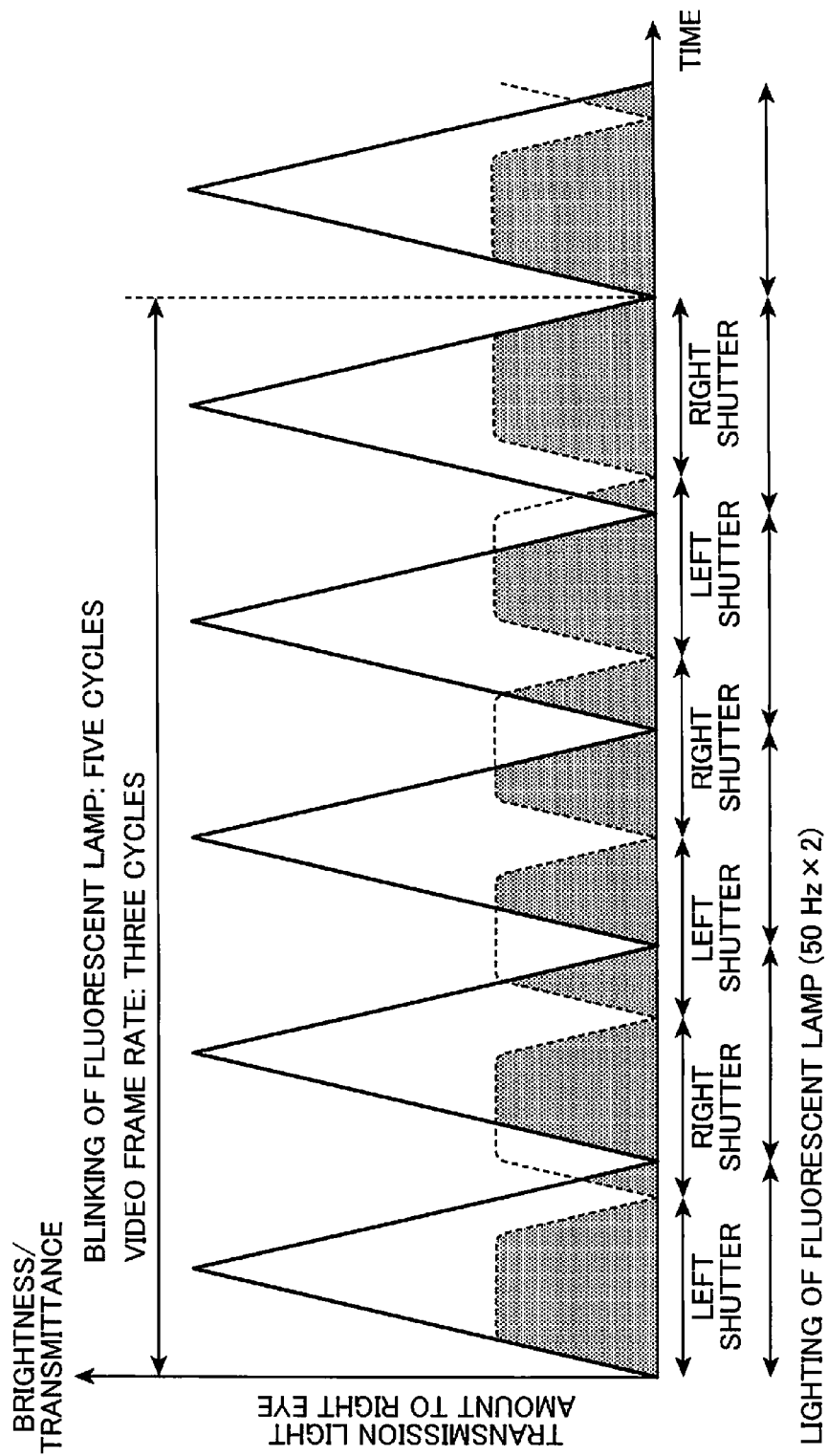
FIG. 6 is a graph schematically showing a relationship between variation in transmission light amount permitted by the optical shutter portion and blinking of a fluorescent lamp.

FIG. 6 is a graph schematically showing a relationship between the variation in transmission light amount permitted by the optical shutter portion 310 and the blinking of the fluorescent lamp 400. In the graph in FIG. 6, the dotted line indicates the variation in transmission light amount permitted by the optical shutter portion 310. The solid line indicates the brightness variation of the fluorescent lamp 400. As shown in FIG. 6, the left and right shutters 311, 312 open and close alternately so that the transmission light amount to the left and right eyes alternately increases. The horizontal axis of the graph in FIG. 6 is a time axis. The vertical axis of the graph in FIG. 6 indicates the transmission light amount permitted by the optical shutter portion 310 and the brightness of the fluorescent lamp 400. The optical shutter portion 310 operates in response to the synchronized control described in the context of FIG. 5. It should be noted that blinking of the fluorescent lamp 400 is not taken into account in the synchronized control. The principles behind occurrence of flickering are described with reference to FIGS. 1, 3, 5 and 6.

FIG. 6 shows brightness variation of the fluorescent lamp 400 to which an AC voltage at 50 Hz is supplied. The fluorescent lamp 400 regulates the 50 Hz AC current and inverts the portion of the voltage having opposite amplitude. Consequently, the fluorescent lamp 400 flickers at a frequency twice as high as the AC voltage frequency (in other words, 100 Hz).

The display portion 230 of the display device 200 displays L and R frame images at a display frequency of 60 Hz, respectively. In other words, the display portion 230 switches alternately the L and R frame images at a frequency of 120 Hz. The left and right shutters 311, 312 of the optical shutter portion 310 of the eyeglass device 300 open and close in synchronism with the synchronization signal sent from the display device 200 to vary the light transmission amount through the optical shutter portion 310 at a frequency of 120 Hz, as shown by the dotted line in FIG. 6.

Under the aforementioned conditions, the frequency of the brightness variation of the fluorescent lamp 400 is different from the opening and closing frequency of the left and right shutters 311, 312 of the optical shutter portion 310. In FIG. 6, the overlapping region (hatched region) between the regions surrounded by the solid and dotted lines indicates a light amount from the fluorescent lamp 400, which is transmitted through the optical shutter portion 310 of the eyeglass device 300. The light amount from the fluorescent lamp 400 transmitted through the optical shutter portion 310 depends on a relationship between the opening/closing timings of the left and right shutters 311, 312 of the optical shutter portion 310 and the blinking period of the fluorescent lamp 400. Therefore the light amount from the fluorescent lamp 400 varies each video frame. As a result of increase and decrease in transmission light amount, which is indicated by the hatched region in FIG. 6, the viewer may potentially perceive brightening and darkening of the viewing environment and the video images. Such phenomena are known as flicker, which is one of causes that worsen qualities in viewed video images.

The synchronization signal generated by the display device 200 is controlled, frame by frame, according to the following control methodologies to moderate the aforementioned flicker phenomena.

<Moderation of Flicker: First Control Methodologies>

Figure 7:
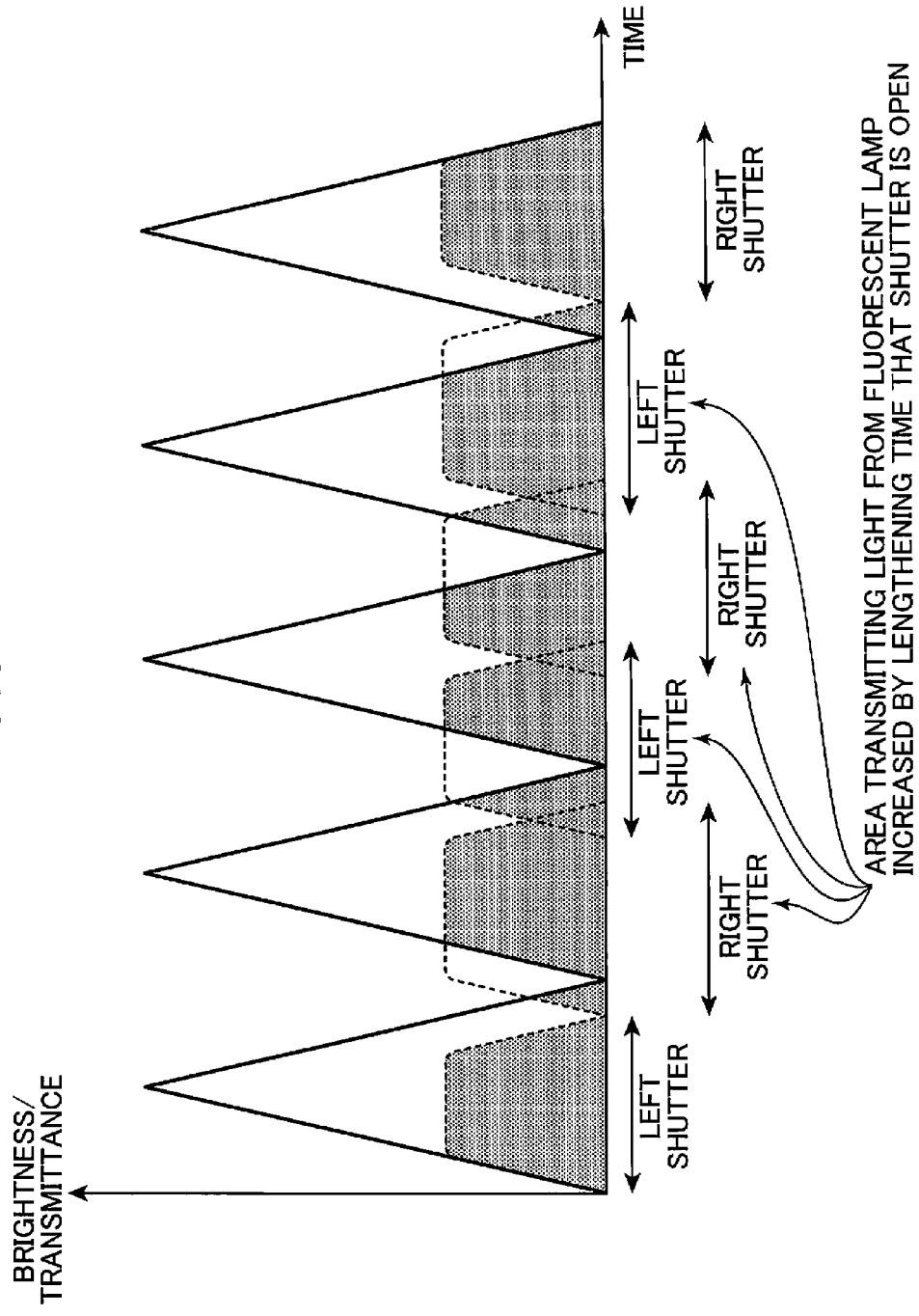
FIG. 7 is a graph showing variation in transmission light amount permitted by the optical shutter portion, which operates in accordance with the first control methodologies for reducing flicker.

FIG. 7 is a graph showing variation in the transmission light amount permitted by the optical shutter portion 310 which operates under the control for moderating the aforementioned flicker. The first control methodologies to moderate the flicker are described with reference to FIGS. 1, 3, 6 and 7.

The first generator 236 of the display device 200 generates a synchronization signal including a reference signal for adapting the assistance operation of the eyeglass device 300 to the display of the L and R frame images and the blinking of the fluorescent lamp 400 on the basis of the frame rate of the L and R frame images displayed by the display portion 230 and the lighting frequency of the fluorescent lamp 400, which is input from the detector 239. The reference signal is described below.

The transmission timings of the pulse signal for opening the left shutter 311, the pulse signal for closing the left shutter 311, the pulse signal for opening the right shutter 312 and the pulse signal for closing the right shutter 312 are adjusted according to the first control methodologies shown in FIG. 7, so that the opening and closing timings of the left and right shutters 311, 312 are advanced or delayed. Alternatively, the opening and closing time periods of the left and right shutters 311, 312 may be shifted together. The opening and closing timings of the optical shutter portion 310 are adjusted to appropriately moderate the aforementioned flicker.

With comparing FIG. 7 to FIG. 6, the initial open time period of the right shutter 312, the second open time period of the left shutter 311, the second open time period of the right shutter 312 and the third open time period of the left shutter 311 are set to be longer, respectively, in accordance with the first control methodologies shown in FIG. 7. The open and close time periods of the left and right shutters 311, 312 of the optical shutter portion 310 are adjusted, respectively, each frame of the video image shown by the display portion 230 of the display device 200, so that a substantially consistent light amount from the fluorescent lamp 400 is transmitted through the optical shutter portion 310. Since the light amount from the fluorescent lamp 400, which is incident on the viewer's eyes, becomes substantially consistent, the flicker phenomena (the phenomena making a viewer perceive periodic blinking) are moderated.

In the graph in FIG. 7, the dotted line indicates variation in the transmission light amount permitted by the optical shutter portion 310. The solid line indicates brightness variation of the fluorescent lamp 400. The overlapping region (hatched region) between the regions surrounded by the dotted and solid lines indicates the light amount from the fluorescent lamp 400, which is incident on the viewer's eyes. If the open time periods of the left and right shutters 311, 312 are adjusted so that areas of hatched regions become equivalent, it becomes less likely that the viewer perceives the flicker. According to the first control methodologies, the transmission timings of the pulse signal for opening the left shutter 311, the pulse signal for closing the left shutter 311, the pulse signal for opening the right shutter 312 and the pulse signal for closing the right shutter 312 are controlled so that the variation in light amount from the fluorescent lamp 400, which is transmitted through the optical shutter portion 310, falls within a prescribed range.

The first generator 236 of the display device 200 determines the transmission timings of the pulse signal for opening the left shutter 311, the pulse signal for closing the left shutter 311, the pulse signal for opening the right shutter 312 and the pulse signal for closing the right shutter 312 on the basis of the frame rate of the displayed video image and the period of blinking of the fluorescent lamp 400. In the following control methodologies, one of the pulse signal for opening the left shutter 311, the pulse signal for closing the left shutter 311, the pulse signal for opening the right shutter 312, and the pulse signal for closing the right shutter 312, is used as a reference signal for adapting the assistance operation of the optical shutter portion 310 to the frame images displayed on the display portion 230 and the blinking of the fluorescent lamp 400. The transmitter 233 transmits a synchronization signal including these pulse signals to the eyeglass device 300. The eyeglass device 300 causes the optical shutter portion 310 to perform the assistance operation on the basis of the information relating to the frame rate of the video image and the information relating to synchronization with the blinking of the fluorescent lamp 400, which are included in the pulse signals of the synchronization signal from the display device 200. Therefore, it becomes less likely that the viewer perceives the flicker even if the viewer watches a stereoscopic image under the fluorescent lamp 400 which repeats periodic blinking actions.

According to the first control methodologies described in the context of FIG. 7, longer open time periods are set for the motion of the left and right shutters 311, 312 than the open time periods of the left and right shutters 311, 312 shown in FIG. 6. Alternatively, the left and right shutters 311, 312 are controlled so as to open for a shorter time than the open time periods of the left and right shutters 311, 312 shown in FIG. 6, which may result in consistent light amounts from the fluorescent lamp 400 to the viewer's eyes.

<Moderation of Flicker: Second Control Methodologies>

Figure 8:
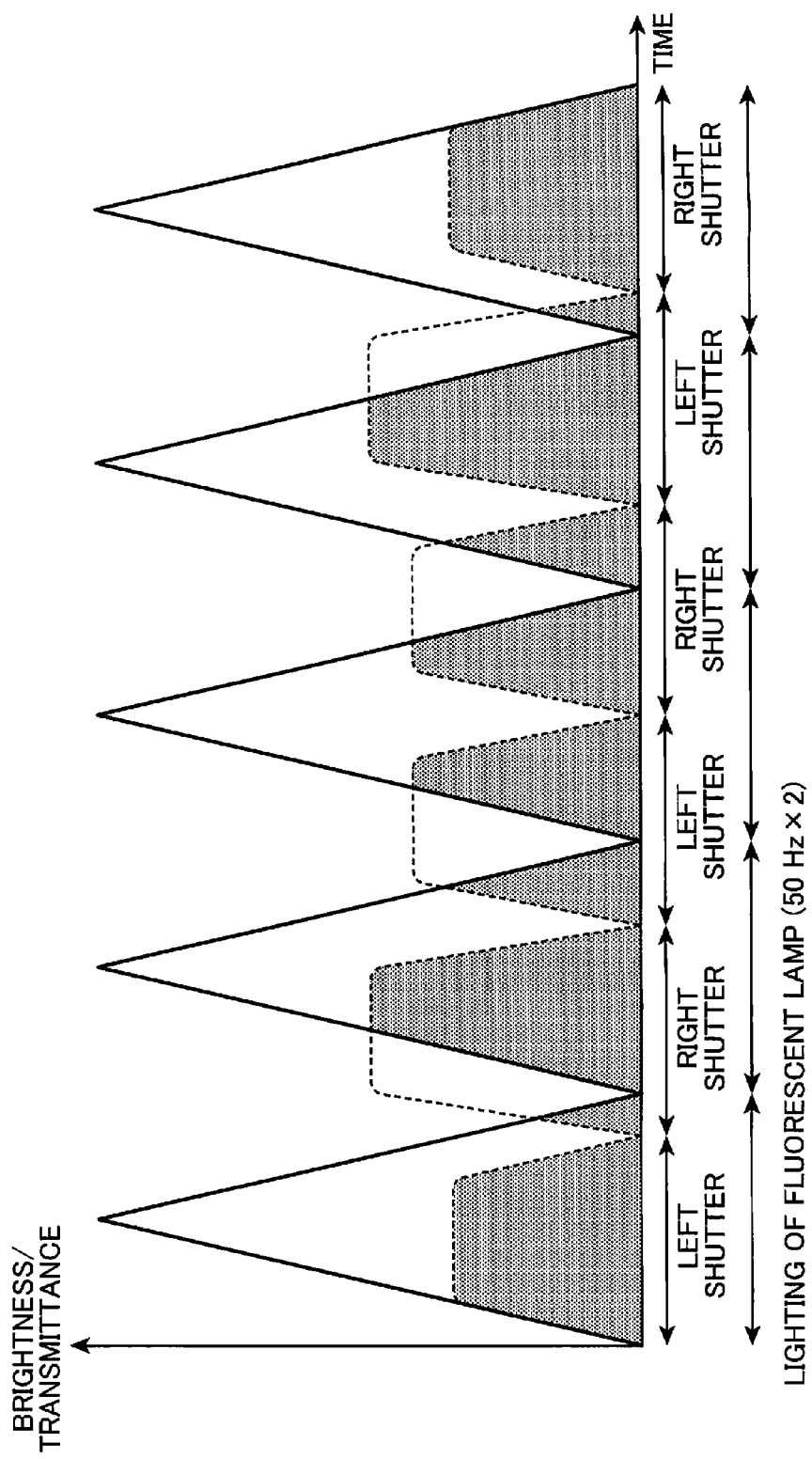
FIG. 8 is a graph showing variation in transmission light amount permitted by the optical shutter portion, which operates in accordance with the second control methodologies for reducing flicker.

FIG. 8 is a graph showing variation in the transmission light amount permitted by the optical shutter portion 310 which operates under the control for moderating the aforementioned flicker. The second control methodologies for moderating the flicker are described with reference to FIGS. 1, 3, 6 and 8.

According to the second control methodologies shown in FIG. 8, the left and right shutters 311, 312 of the optical shutter portion 310 are open as long as the open time period shown in FIG. 6. However, the transmittance of the optical shutter portion 310 is varied.

With comparing FIG. 8 to FIG. 6, the transmittance of the right shutter 312 during the initial open time period of the right shutter 312, the transmittance of the left shutter 311 during the second open time period of the left shutter 311, the transmittance of the right shutter 312 during the second open time period of the right shutter 312 and the transmittance of the left shutter 311 during the third open time period of the left shutter 311 are increased, respectively, in accordance with the second control methodologies shown in FIG. 8. The transmittances of the left and right shutters 311, 312 are adjusted whenever the optical shutter portion 310 is opened or closed, so that a substantially consistent light amount from the fluorescent lamp 400 is transmitted through the optical shutter portion 310.

The first generator 236 of the display device 200 calculates a suitable transmittance of the left and right shutters 311, 312 for each frame on the basis of the frame rate of the displayed video image and the blinking frequency of the fluorescent lamp 400. When the first generator 236 generates the pulse signal for opening the left shutter 311, the pulse signal for closing the left shutter 311, the pulse signal for opening the right shutter 312 and the pulse signal for closing the right shutter 312, the first generator 236 sets information relating to the calculated transmittances in these pulse signals. In the following control methodologies, one of the pulse signal for opening the left shutter 311, the pulse signal for closing the left shutter 311, the pulse signal for opening the right shutter 312 and the pulse signal for closing the right shutter 312 is used as a reference signal for adapting the assistance operation of the optical shutter portion 310 to the frame images displayed on the display portion 230 and the blinking of the fluorescent lamp 400. The transmitter 233 transmits a synchronization signal including these pulse signals to the eyeglass device 300. The eyeglass device 300 causes the optical shutter portion 310 to perform the assistance operation on the basis of the information relating to the frame rate of the video image and the information relating to the transmittance, which are included in the pulse signals of the synchronization signal from the display device 200. Therefore, the left and right shutters 311, 312 are controlled so that a substantially consistent light amount of the fluorescent lamp 400 is transmitted through the optical shutter portion 310 (so that variation in light amount falls within a prescribed range). Thus it becomes less likely that a viewer watching the stereoscopic image perceives the flicker.

According to the second control methodologies shown in FIG. 8, the transmittances of the left and right shutters 311, 312 of the optical shutter portion 310 are set to be greater than the transmittances shown in FIG. 6. Alternatively, the transmittances of the left and right shutters 311, 312 of the optical shutter portion 310 may be reduced so that a substantially consistent light amount from the fluorescent lamp 400 is transmitted through the left and right shutters 311, 312. The flicker may be similarly moderated by the reduction in transmittance.

<Moderation of Flicker: Third Control Methodologies>

Figure 9:
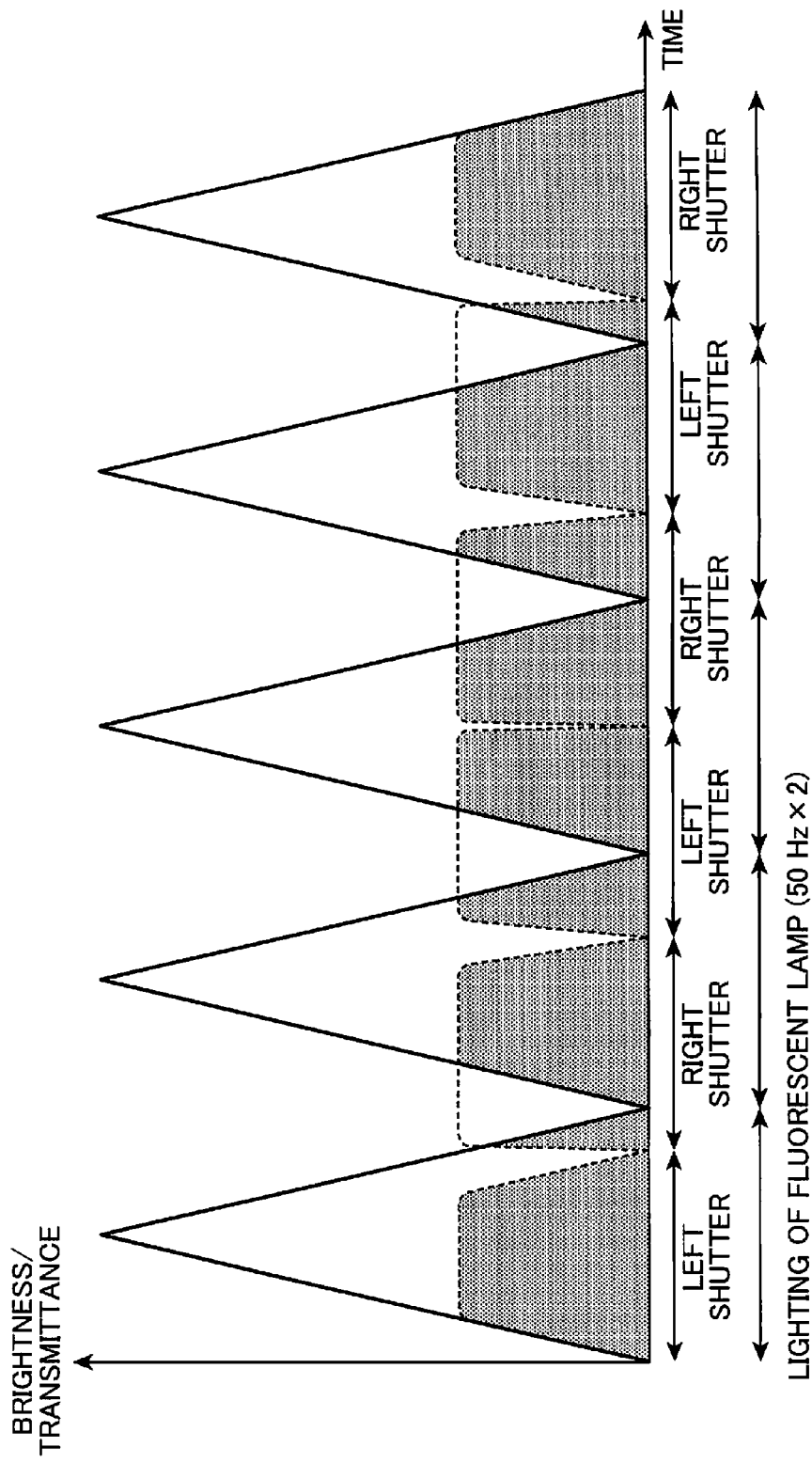
FIG. 9 is a graph showing variation in transmission light amount permitted by the optical shutter portion, which operates in accordance with the third control methodologies for reducing flicker.

FIG. 9 is a graph showing variation in transmission light amount permitted by the optical shutter portion 310 which operates under the control for moderating the aforementioned flicker. The third control methodologies for moderating the flicker are described with reference to FIGS. 1, 3, 6 and 9.

According to the third control methodologies shown in FIG. 9, the left and right shutters 311, 312 of the optical shutter portion 310 are opened as long as the open time periods shown in FIG. 6. However, the optical shutter portion 310 is controlled so that the response speed (transmittance/time) of the optical shutter portion 310 is adjusted whenever the left and right shutters 311, 312 is operated to open/close.

With comparing FIG. 9 to FIG. 6, the response speed of the right shutter 312 during the initial open time of the right shutter 312, the response speed of the left shutter 311 during the second open time of the left shutter 311, the response speed of the right shutter 312 during the second open time of the right shutter 312 and the response speed of the left shutter 311 during the third open time of the left shutter 311 are increased, respectively, in accordance with the third control methodologies shown in FIG. 9. As a result of the increase in response speed, the optical shutter portion 310 is open at a high transmittance for a longer time, so that an increased light amount from the fluorescent lamp 400 is transmitted through the optical shutter portion 310. Therefore, a substantially consistent light amount from the fluorescent lamp 400 is incident on the eyes of the viewer watching the video image.

The first generator 236 of the display device 200 determines a suitable response speed of the left and right shutters 311, 312 for each frame on the basis of the frame rate of the displayed video image and the blinking frequency of the fluorescent lamp 400. When the first generator 236 generates the pulse signal for opening the left shutter 311, the pulse signal for closing the left shutter 311, the pulse signal for opening the right shutter 312 and the pulse signal for closing the right shutter 312, the first generator 236 sets the information relating to the determined response speeds in these pulse signals. In the following control methodologies, one of the pulse signal for opening the left shutter 311, the pulse signal for closing the left shutter 311, the pulse signal for opening the right shutter 312 and the pulse signal for closing the right shutter 312 is used as the reference signal for adapting the assistance operation of the optical shutter portion 310 to the frame images displayed on the display portion 230 and the blinking of the fluorescent lamp 400. The transmitter 233 transmits a synchronization signal including these pulse signals to the eyeglass device 300. The eyeglass device 300 causes the optical shutter portion 310 to perform the assistance operation on the basis of the information relating to the frame rate of the video image and the information relating to the response speed, which are included in the pulse signal of the synchronization signal from the display device 200. Therefore, the left and right shutters 311, 312 are controlled so that a substantially consistent light amount from the fluorescent lamp 400 is transmitted through the optical shutter portion 310 (so that the variation in light amount falls within a prescribed range). Accordingly, it becomes less likely that a viewer watching the stereoscopic image perceives the flicker.

According to the third control methodologies shown in FIG. 9, the response speeds of the left and right shutters 311, 312 of the optical shutter portion 310 are set to be greater than the response speeds shown in FIG. 6. Alternatively, the response speeds of the left and right shutters 311, 312 of the optical shutter portion 310 may be reduced so that a substantially consistent light amount from the fluorescent lamp 400 is transmitted through the left and right shutters 311, 312. The flicker may be similarly moderated by the reduction in response speed.

As described above, the opening and closing timings of the left and right shutters 311, 312 of the optical shutter portion 310 (first control methodologies), the transmittance of the optical shutter portion 310 (second control methodologies), and the response speed of the optical shutter portion 310 (third control methodologies) are adjusted, respectively, to make the transmission light amount from the fluorescent lamp 400 substantially consistent. Alternatively, the first to third control methodologies may be combined together, so as to achieve a consistent transmission light amount from the fluorescent lamp 400.

According to the first, second and/or third control methodologies, the first generator 236 of the display device 200 generates a synchronization signal including control information such as the open time period of the optical shutter portion 310, the transmittance of the optical shutter portion 310 and/or the response speed of the optical shutter portion 310, and then the transmitter 233 sends the synchronization signal to the eyeglass device 300.

<Synchronization Signal>

FIG. 10 shows a format of a synchronization signal transmitted by the transmitter 233 and control information included in the synchronization signal. The synchronization signal is described with reference to FIG. 1, FIGS. 3 to 5, and FIGS. 7 to 10.

Section (A) in FIG. 10 shows a data format of a pulse signal included in the synchronization signal transmitted by the transmitter 233. Section (B) in FIG. 10 is a chart showing the data format shown in section (A) in details.

The pulse signal data include a start bit, a timing flag, a shutter open/close flag, a left/right shutter flag, transmittance information, response speed information, shutter open time information, and a parity bit.

The start bit is used to identify the start of the data. The receiver 333 and the signal detector 334 of the eyeglass device 300 identify the start bit to detect reception of a pulse signal of the synchronization signal.

The timing flag is used to manage the opening and closing timings of the optical shutter portion 310 every a prescribed number of video frames. The management of the opening and closing timings of the optical shutter portion 310 by means of the timing flag is described hereinafter.

The shutter open/close flag is used to identify whether the pulse signal of the synchronization signal indicates "open the optical shutter portion 310 (increase a transmission light amount)" or "close the optical shutter portion 310 (decrease a transmission light amount)".

The left/right shutter flag is used to identify which is the control target, the left or right shutter 311, 312 of the optical shutter portion 310. On the basis of the shutter open/close flag and the left/right shutter flag, the pulse signals LO, LC, RO and RC described in the context of section (B) in FIG. 5, for example, are suitably identified.

The transmittance information indicates the transmittance according to the second control methodologies, which are described in the context of FIG. 8. The transmittance information is set for each opening and closing operation of the optical shutter portion 310. In the present embodiment, transmittance (transmission rate) may be set to a value of 25%, 50%, 75% and 100%. Alternatively, the transmittance may be set to another value. The transmittance may be set to a greater or smaller number of values. A more variety of values, to which the transmittance is set, means that a more consistent light amount from the fluorescent lamp is transmitted through the optical shutter portion 310.

The response speed information indicates the response speed according to the third control methodologies which are described in the context of FIG. 9. The response speed information is set for each opening and closing operation of the optical shutter portion 310. In the present embodiment, the response speed may be set to three options: "fast", "standard" and "slow". Alternatively, more or less than three options may be provided for the response speed. A more various options for the response speed means that a more consistent light amount from the fluorescent lamp is transmitted through the optical shutter portion 310.

The shutter open time information is set to correspond to the open time periods of the left and right shutters 311, 312 in the optical shutter portion 310, respectively. In order to set the open time periods of the optical shutter portion 310, as shown in FIG. 10, the shutter open time information may be logically included in the pulse signal of the synchronization signal. Alternatively, as described in the context of FIG. 5, the open time period of the optical shutter portion 310 may be determined by the transmission timings of the pulse signals LO, LC, RO and RC (in other words, the timings at which the pulse signals LO, LC, RO and RC are actually received by the eyeglass device 300). According to the data format shown in FIG. 10, "short", "standard" and "long" are prepared as parameters for the open time period of the optical shutter portion 310. Alternatively, a greater or smaller number of parameters may be prepared. A more variety of parameters means that a more consistent light amount from the fluorescent lamp is transmitted through the optical shutter portion 310.

The parity bit is used to confirm consistency of the bit data from the start bit to the shutter open time information. For example, a number of valid bits from the start bit to the parity bit (the number of bits set to "1") may be set to an odd or even number. The parity bit is used to adjust the number of valid bits.

The first generator 236 of the display device 200 determines information relating to control conditions for the opening and closing time periods, transmittance and/or response speed, for each opening and closing operation of the left and right shutters 311, 312 of the optical shutter portion 310. The first generator 236 generates a synchronization signal with the pulse signals which include the determined control information. The transmitter 233 transmits the generated synchronization signal to the eyeglass device 300. The eyeglass device 300 receives the synchronization signal transmitted by the display device 200. The optical shutter portion 310 is controlled in accordance with the control information included in the pulse signals of the synchronization signal. Accordingly it becomes less likely that the viewer perceives the flicker. Thus the viewer may comfortably watch the video image.

In the present embodiment, the shutter open time, transmittance and response speed are exemplified as the control parameters for the optical shutter portion 310. Alternatively, other control parameters relating to the operation of the optical shutter portion 310 of the eyeglass device 300 may be used to achieve a consistent transmission light amount from the fluorescent lamp 400.

<Combination of Lighting Period of Fluorescent Lamp with Frame Rate of Video Image>

As described above, the first generator 236 of the display device 200 generates a synchronization signal with pulse signals which define control conditions for the optical shutter portion 310 of the eyeglass device 300 on the basis of the lighting period of the fluorescent lamp 400 and the frame rate of the video image. The blinking frequency of the fluorescent lamp 400 is dependent on the frequency of the AC voltage supplied to the fluorescent lamp 400. The frequency of the AC voltage applied to the fluorescent lamp 400 is typically 50 Hz or 60 Hz. As a result of the fluorescent lamp 400 regulating the AC current, the fluorescent lamp 400 blinks at a frequency (100 Hz or 120 Hz) which is twice as high as the frequency of the AC voltage. Generally, several different frame rates are set in advance for the video displayed by the display portion 230 of the display device 200.

FIG. 11 shows a combination of the lighting frequency of the fluorescent lamp 400 with the frame rate of the video image. The combination of the lighting frequency of the fluorescent lamp 400 with the frame rate of the video image is described with reference to FIGS. 1, 3, 4, 6 and 11.

As shown in FIG. 11, the combination of the lighting frequency of the fluorescent lamp 400 with the frame rate of the video image is limited to several patterns. In FIG. 11, the lighting frequency of fluorescent lamp 400 is one value of 100 Hz or 120 Hz. The video frame rate (the combined frame rate of the left and right video images) is 96 Hz, 100 Hz, 120 Hz or 144 Hz.

The leftmost column in the table in FIG. 11, which indicates a relationship between the lighting frequency of the fluorescent lamp 400 and the video frame rate, shows the lighting frequency of the fluorescent lamp 400. The right column with respect to the column showing the lighting frequency of the fluorescent lamp 400 indicates the video frame rate. The column labeled "combined period" in the table in FIG. 11 indicates patterns where the lighting period of the fluorescent lamp 400 matches with the display period of the video.

If the lighting frequency of the fluorescent lamp 400 is 100 Hz and the video frame rate is 100 Hz, the lighting frequency of the fluorescent lamp 400 is equal to the video frame rate, so that one blinking cycle of the fluorescent lamp 400 is synchronized with one cycle of the video image display every 20 ms period. One blinking cycle of the fluorescent lamp 400 indicates a time period from when the fluorescent lamp 400 lights up to when the fluorescent lamp 400 is darkened. One cycle of the video display means a time period during which a set of one L frame image and one R frame image is displayed. Consequently, if the lighting frequency of the fluorescent lamp 400 is 100 Hz and the video frame rate is 100 Hz, the time period corresponding to two blinking cycles of the fluorescent lamp 400 and the time period corresponding to one cycle of the video display becomes "20 ms", respectively, which means that the time period corresponding to two blinking cycles of the fluorescent lamp 400 and the time period corresponding to one cycle of the video display are synchronous (matched).

The column titled "blinking cycle" in FIG. 11 indicates a number of blinking cycles of the fluorescent lamp 400 which becomes equivalent to a length of the video display cycle. The column titled "video display cycle" in FIG. 11 indicates a number of cycles of the video display which becomes equivalent to a length of the blinking cycle of the fluorescent lamp 400. The column titled "synchronization period" in FIG. 11 indicates a time period until the length of the blinking cycle of the fluorescent lamp matches with the length of the video display cycle.

If the lighting frequency of the fluorescent lamp 400 is 100 Hz and the video frame rate is 100 Hz, it becomes less likely that a viewer perceives the flicker without specific information which is used to control the optical shutter portion 310 for moderating the flicker. Similarly if the lighting frequency of the fluorescent lamp 400 is 120 Hz and the video frame rate is 120 Hz, it becomes less likely that a viewer perceives the flicker without specific information which is used to control the optical shutter portion 310 for moderating the flicker.

Under the other conditions shown in FIG. 11, the synchronization signal preferably includes specific information for moderating the flicker. For example, according to the blinking operation of the fluorescent lamp 400 (lighting frequency: 100 Hz) and the video frame rate (120 Hz) described in the context of FIG. 6, three cycles of the video display is as long as five cycles of the blinking operation of the fluorescent lamp 400. In this case, the synchronization period becomes 50 ms.

The first generator 236 of the display device 200 controls generation of a synchronization signal, every "50 ms period" (three cycles of the video display; five blinking cycles of the fluorescent lamp 400). The first generator 236 processes three cycles of the video frames as one control unit to generate a synchronization signal for controlling the optical shutter portion 310 of the eyeglass device 300, and sets the control conditions for the synchronization signal (various control information, such as the shutter open time, transmittance, and response speed). Once the first generator 236 determines the aforementioned control conditions, the first generator 236 sets information indicating similar control conditions in the synchronization signal per every three cycles of the video frames.

Preferably, the first generator 236 generates a reference signal which indicates the start of the control unit. By means of the reference signal, the eyeglass device 300 identifies the start of the control unit to cause the optical shutter portion 310 to perform the suitable assistance operation. The generation, transmission and process of the reference signal are described below.

As shown in FIG. 11, if the lighting frequency of the fluorescent lamp 400 and the video frame rate are determined in advance, the first generator 236 may use previously calculated (determined) values as the control information for the eyeglass device 300 without calculation processes for acquiring control information.

As described above, if the relationship between the lighting frequency of the fluorescent lamp 400 and the frame rate of the video images displayed by the display device 200 is kept consistent, the first generator 236 generates a synchronization signal including information with prescribed control values for controlling the optical shutter portion 310 per every predetermined period of the video frame or every predetermined blinking period of the fluorescent lamp 400. Thus, it becomes less likely that the viewer perceives any flicker. Therefore the viewer may comfortably watch the video.

<Synchronization Signal Transmission>

Figure 12:
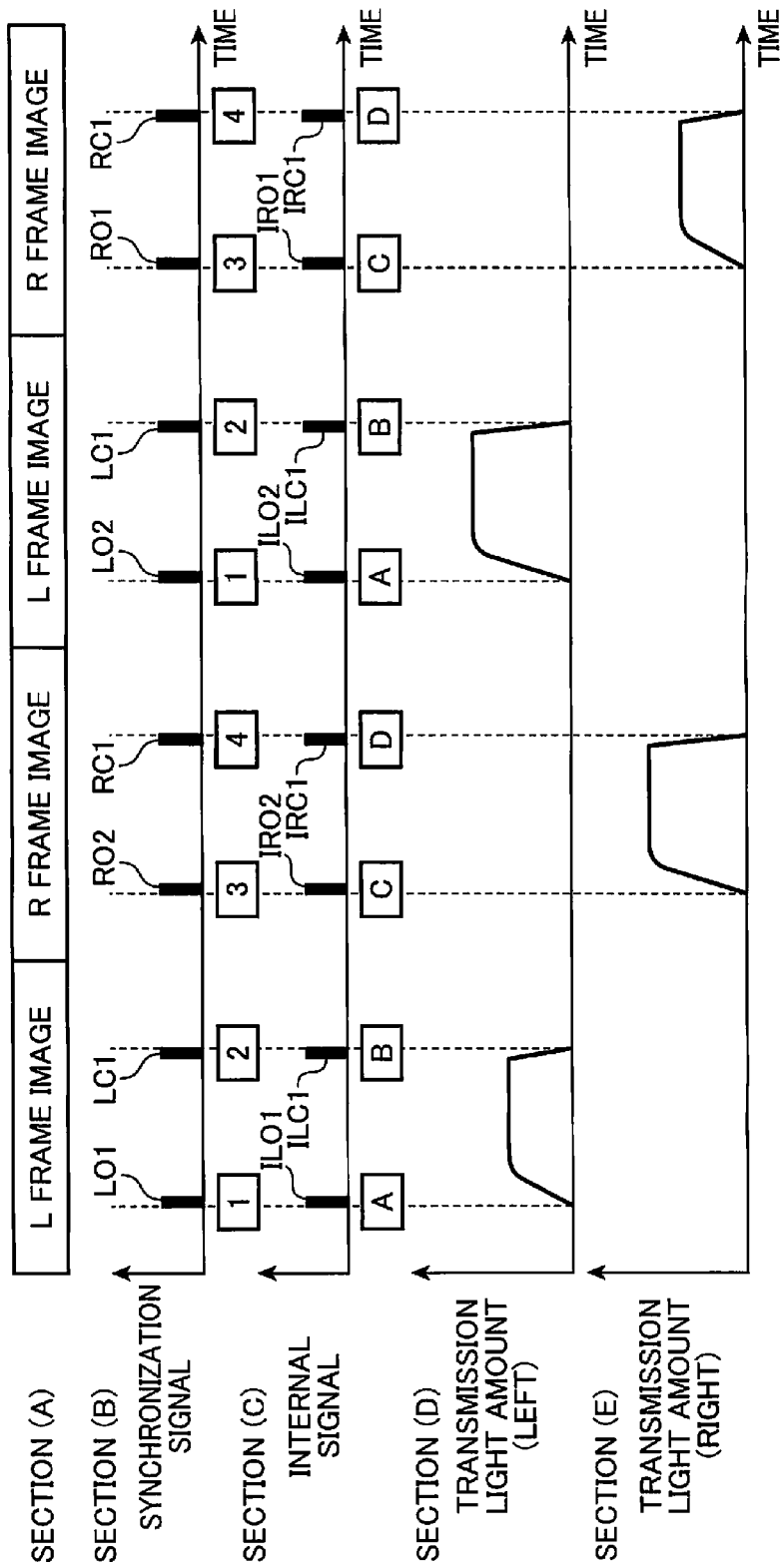
FIG. 12 is a timing chart schematically showing transmission of a synchronization signal including control information.

FIG. 12 is a timing chart schematically showing transmission of a synchronization signal including control information described in the context of FIG. 10. The transmission of the synchronization signal is described with reference to FIGS. 1, 3, 4, 10 and 12.

Section (A) in FIG. 12 shows a frame image displayed by the display portion 230. As show in section (A) in FIG. 12, the display portion 230 alternately displays L and R frame images.

Section (B) in FIG. 12 is a timing chart which shows a synchronization signal generated by the first generator 236 of the display device 200. As described above, the synchronization signal is transmitted to the eyeglass device 300 by the transmitter 233. The synchronization signal includes pulse signals LO1, LO2, LC1, RO1, RO2 and RC1. The pulse signal LO1 includes first command information for increasing a transmission light amount to the viewer's left eye and transmittance information which defines a transmittance of 50%. The pulse signal LO2 includes first command information for increasing the transmission light amount to the viewer's left eye and transmittance information which defines a transmittance of 75%. The pulse signal LC1 includes second command information for decreasing the transmission light amount to the viewer's left eye. The pulse signal RO1 includes third command information for increasing a transmission light amount to the viewer's right eye and transmittance information which defines a transmittance of 50%. The pulse signal RO2 includes third command information for increasing the transmission light amount to the viewer's right eye and transmittance information which defines a transmittance of 75%. The pulse signal RC1 includes fourth command information for decreasing the transmission light amount to the viewer's right eye. In the present embodiment, the pulse signals LO1, LO2, LC1, RO1, RO2 and RC1 are exemplified as the control signals for causing the eyeglass device 300 to perform the assistance operation, respectively.

The transmitter 233 transmits the pulse signal LO1 in synchronization with the start of the L frame image display. Accordingly, the left shutter 311 opens at a transmittance of 50% in synchronization with the start of the L frame image display. The transmitter 233 transmits the pulse signal LO2 in synchronization with the start of the subsequent display of the L frame image. Accordingly, the left shutter 311 opens at a transmittance of 75% in synchronization with the start of the L frame image display.

The transmitter 233 transmits the pulse signal LC1 in synchronization with the end of the L frame image display. Accordingly, the left shutter 311 closes in synchronization with the end of the L frame image display to decrease the transmission light amount to the viewer's left eye.

The transmitter 233 transmits the pulse signal RO2 in synchronization with the start of the R frame image display. Accordingly, the right shutter 312 opens at a transmittance of 75% in synchronization with the start of the R frame image display. The transmitter 233 transmits the pulse signal RO1 in synchronization with the start of the subsequent display of the R frame image. Accordingly, the right shutter 312 opens at a transmittance of 50% in synchronization with the start of the R frame image display.

The transmitter 233 transmits the pulse signal RC1 in synchronization with the end of the R frame image display. Accordingly, the right shutter 312 closes in synchronization with the end of the R frame image display to decrease the transmission light amount to the viewer's right eye.

Section (C) in FIG. 12 is a timing chart which shows an internal signal generated by the second generator 337 of the eyeglass device 300. As described above, the second generator 337 generates the internal signal on the basis of a synchronization signal received by the receiver 333.

The second generator 337 generates a pulse signal ILO1 in response to the pulse signal LO1. The shutter controller 338 controls the optical shutter portion 310 so that the left shutter 311 opens at a transmittance of 50% in response to the pulse signal ILO1. The second generator 337 generates a pulse signal ILO2 in response to the pulse signal LO2. The shutter controller 338 controls the optical shutter portion 310 so that the left shutter 311 opens at a transmittance of 75% in response to the pulse signal ILO2.

The second generator 337 generates a pulse signal ILC1 in response to the pulse signal LC1. The shutter controller 338 controls the optical shutter portion 310 so that the left shutter 311 closes in response to the pulse signal ILC1.

The second generator 337 generates a pulse signal IRO1 in response to the pulse signal RO1. The shutter controller 338 controls the optical shutter portion 310 so that the right shutter 312 opens at a transmittance of 50% in response to the pulse signal IRO1. The second generator 337 generates a pulse signal IRO2 in response to the pulse signal RO2. The shutter controller 338 controls the optical shutter portion 310 so that the right shutter 312 opens at a transmittance of 75% in response to the pulse signal IRO2.

The second generator 337 generates a pulse signal IRC1 in response to the pulse signal RC1. The shutter controller 338 controls the optical shutter portion 310 so that the right shutter 312 closes in response to the pulse signal IRC1.

Section (D) in FIG. 12 is a timing chart showing variation in transmission light amount to the left eye. Section (E) in FIG. 12 is a timing chart showing variation in transmission light amount to the right eye.

As described above, the pulse signals LO1, LO2 are transmitted in synchronization with the start of the L frame image display. The pulse signals ILO1, ILO2, which are used to control the opening of the left shutter 311, are generated in response to the pulse signals LO1, LO2, respectively. Consequently, the left shutter 311 opens at a transmittance of 50% in response to the transmission of the pulse signal LO1. The left shutter 311 opens at a transmittance of 75% in response to the transmission of the pulse signal LO2. Thus, the transmission light amount to the left eye starts to increase in synchronization with the start of the L frame image display.

As described above, the pulse signal LC1 is transmitted in synchronization with the end of the L frame image display. The pulse signal ILC1, which is used to control the closing of the left shutter 311, is generated in response to the pulse signal LC1. Consequently, the left shutter 311 closes in synchronization with the end of the L frame image display. Thus, the transmission light amount to the left eye starts to decrease in synchronization with the end of the L frame image display.

As described above, the pulse signals RO1, RO2 are transmitted in synchronization with the start of the R frame image display. The pulse signals IRO1, IRO2, which are used to control the opening of the right shutter 312, are generated in response to the pulse signals RO1, RO2, respectively. Consequently, the right shutter 312 opens at a transmittance of 50% in response to the transmission of the pulse signal RO1. The right shutter 312 opens at a transmittance of 75% in response to the transmission of the pulse signal RO2. Thus, the transmission light amount to the right eye starts to increase in synchronization with the start of the R frame image display.

As described above, the pulse signal RC1 is transmitted in synchronization with the end of the R frame image display. The pulse signal IRC1, which is used to control the closing of the right shutter 312, is generated in response to the pulse signal RC1. Consequently, the right shutter 312 closes in synchronization with the end of the R frame image display. Thus, the transmission light amount to the right eye starts to decrease in synchronization with the end of the R frame image display.

As shown in FIG. 12, a synchronization signal described in the context of section (A) in FIG. 10 is transmitted whenever the optical shutter portion 310 is operated to open and close. In the control methodologies shown in FIG. 12, the transmittance of the optical shutter portion 310 is adjusted. Alternatively, the shutter open time and/or the response speed may be adjusted in accordance with the aforementioned first and/or third control methodologies. If the shutter open time is adjusted, the pulse signal for closing the optical shutter portion 310 may be omitted. If the relationship between the lighting frequency of the fluorescent lamp 400 and the video frame rate is kept consistent, all of the pulse signals transmitted by the display device 200 do not have to contain control information such as the transmittance information, response speed and/or open time information.

Figure 13:
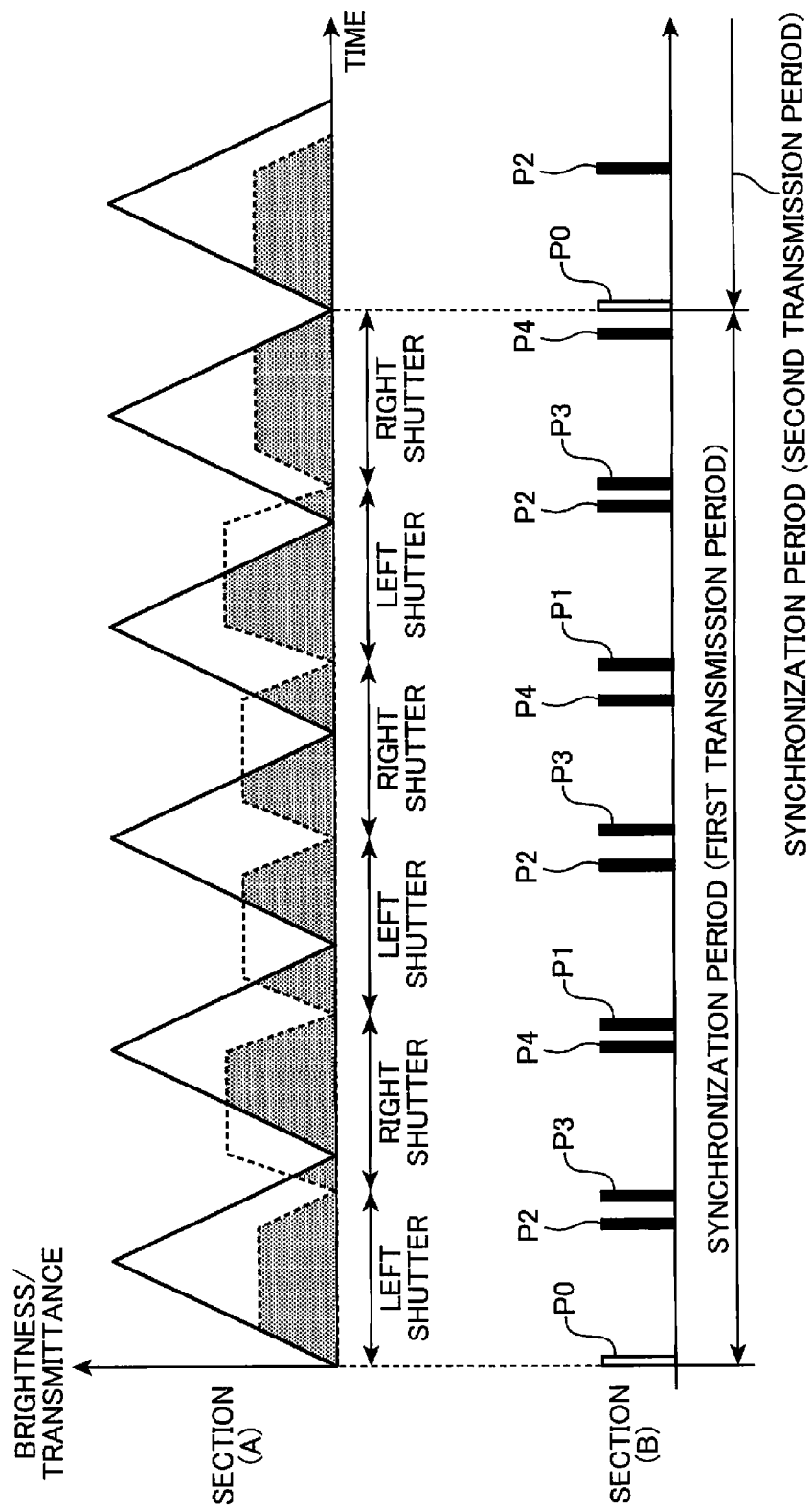
FIG. 13 is a timing chart schematically showing simplified transmission of a synchronization signal including control information.

FIG. 13 is a timing chart schematically showing simplified transmission of a synchronization signal including the control information described in the context of FIG. 10. The transmission of the synchronization signal is described with reference to FIGS. 1, 3, 4, 10 and 13.

As described in the context of FIG. 10, if there is a prescribed relationship between the lighting frequency of the fluorescent lamp 400 and the video frame rate, a consistent flicker pattern appears. The consistent flicker pattern is repeated at every "synchronization period" indicated in FIG. 10. The transmission of the synchronization signal shown in FIG. 13 causes the eyeglass device 300 to perform the suitable assistance operation using the consistent flicker pattern, which is repeated at every "synchronization period".

Section (A) in FIG. 13 is a graph schematically showing a relationship between variation in transmission light amount permitted by the optical shutter portion 310 and blinking of the fluorescent lamp 400. In the graph shown in section (A) of FIG. 13, the dotted line indicates the variation in transmission light amount permitted by the optical shutter portion 310. The solid line indicates brightness variation of the fluorescent lamp 400. Section (B) in FIG. 13 is a timing chart schematically showing a transmission pattern of a synchronization signal.

As shown in section (B) in FIG. 13, the first generator 236 of the display device 200 generates a reference signal P0, which is used as a reference for controlling the eyeglass device 300. The transmitter 233 transmits the reference signal P0, at each "synchronization period", which is determined by the combination between the lighting frequency of the fluorescent lamp 400 and the video frame rate as described in the context of FIG. 10. As described in the context of FIG. 10, the transmission period of the reference signal P0 is longer than the display period of the frame images and the blinking period of the fluorescent lamp 400. In the present embodiment, the transmission period of the reference signal P0 corresponds to a least common multiple of the display period of the frame images and the blinking period of the fluorescent lamp 400. Alternatively, the transmission period of the reference signal P0 may be as long as another common multiple of the display period of the frame images and the blinking period of the fluorescent lamp 400.

In the present embodiment, the reference signal P0 transmits first common information for opening the left shutter 311 to the eyeglass device 300. Alternatively, the reference signal may transmit at least one of second command information for closing the left shutter 311, third command information for opening the right shutter 312, and fourth command information for closing the right shutter 312, to the eyeglass device 300. Further alternatively, the reference signal may not have to transmit information for opening and closing the optical shutter portion 310.

Within the "synchronization period", the first generator 236 generates a pulse signal P2 which transmits the second command information for closing the left shutter 311, a pulse signal P3 which transmits the third command information for opening the right shutter 312, a pulse signal P4 which transmits the fourth command information for closing the right shutter 312, and a pulse signal P1 which transmits first command information for opening the left shutter 311. The transmitter 233 sequentially transmits these pulse signals P2, P3, P4, P1 within the "synchronization period". In the present embodiment, the sequential transmission of the pulse signals P2, P3, P4, P1 is repeated three times within the "synchronization period". The pulse signals P2, P3, P4, P1 are exemplified as the control signal.

The reference signal P0 and the pulse signal P1 both include the first command information for opening the left shutter 311. As described below, the eyeglass device 300 processes the reference signal P0 and the pulse signal P1 as separate signals.

The reference signal P0 and the pulse signals P2, P3, P4, P1 include transmittance information for adjusting the transmittance of the optical shutter portion 310. The first generator 236 may adjust the transmittance information, whenever the reference signal P0 and the pulse signals P2, P3, P4, P1 are generated. In the present embodiment, the pulse signal P3 which is transmitted first in the first transmission period includes transmittance information indicating a higher transmittance than the subsequent pulse signal P3. The pulse signal P1 which is transmitted last in the first transmission period includes transmittance information indicating a higher transmittance than the preceding pulse signal P1.

Section (B) in FIG. 13 shows two reference signals P0. The time period from the transmission of one reference signal P0 until the next reference signal P0 is exemplified as the first transmission period. The "synchronization period" after the first transmission period is exemplified as the second transmission period. The analyzer 335 of the eyeglass device 300 may distinguish the first transmission period from the second transmission period by means of the reference signal P0.

In the first transmission period, the first generator 236 processes signals to generate the reference signal P0 and the pulse signals P2, P3, P4 and P1. In the second transmission period, the first generator 236 may generate the reference signal P0 and the pulse signals P2, P3, P4 and P1 by using the signal processing results obtained during the first transmission period without new signal processes. Accordingly, the transmitter 233 may transmit a signal group for causing the eyeglass device 300 to perform the same assistance operation as that executed during the first transmission period with less loads for information processes.

The receiver 333 of the eyeglass device 300 receives the reference signal P0 and the pulse signals P2, P3, P4 and P1 transmitted in the "synchronization period". The analyzer 335 of the eyeglass device 300 interprets the command information included in the reference signal P0 and the pulse signals P2, P3, P4 and P1 transmitted in the "synchronization period", as one group of commands, and determines the assistance operation of the optical shutter portion 310 in the synchronization period. The analyzer 335 determines the transmittance of the left and right shutters 311, 312 on the basis of the transmittance information included in the reference signal P0 and the pulse signals P2, P3, P4, P1. The analyzer 335 also determines the open time period of the left shutter 311 on the basis of the reception timing of the reference signal P0/pulse signal P1 and the reception timing of the pulse signal P2, which is received immediately after the reference signal P0/pulse signal P1. The analyzer 335 further determines the open time period of the right shutter 312 on the basis of the reception timing of the reference signal P3 and the reception timing of the pulse signal P4, which is received immediately after the reference signal P3. The first generator 236 of the display device 200 adjusts the transmittance information included in the reference signal P0 and the pulse signals P2, P3, P4, P1, and the transmission timings of the reference signal P0 and the pulse signals P2, P3, P4, P1, so that decreased variation in light amount from the fluorescent lamp 400 is transmitted through the optical shutter portion 310. The analyzer 335 processes the signal transmitted during the "synchronization period" as one group, which results in more robust signal processes against noise signals. Therefore it becomes less likely that the eyeglass device 300 is malfunctioned.

In the storage portion 336, the analyzer 335 may record a pattern of the assistance operation determined on the basis of the reference signal P0 and the pulse signals P2, P3, P4 and P1, which have received during the first transmission period.

The optical shutter portion 310 may open and close the left and right shutters 311, 312 during the second transmission period in accordance with the pattern of the assistance operation recorded in the storage portion 336. Accordingly, even if communication of the synchronization signal is temporarily cut off in the second transmission period, the optical shutter portion 310 may still continue the assistance operation.

FIG. 14 shows a format of a synchronization signal described in the context of FIG. 13 and control information included in the synchronization signal. The synchronization signal is described with reference to FIGS. 1, 3, 4, 10, 13 and 14.

Section (A) in FIG. 14 shows a data format of pulse signals included in the synchronization signal transmitted by the transmitter 233. Section (B) in FIG. 14 is a chart showing the data format shown in section (A) in details.

The pulse signal data includes a start bit, a timing flag, a shutter open/closed flag, a left/right shutter flag, lighting frequency information, video frame rate information, phase difference information and a parity bit.

The functions and roles of the start bit, the shutter open/closed flag, the left/right shutter flag and the parity bit correspond to the description in the context of FIG. 10.

As shown in section (B) in FIG. 13, the reference signal P0 is transmitted in synchronization with the start of the "synchronization period". The first generator 236 sets a value of the timing flag to "1" if the first generator 236 generates the reference signal P0. The first generator 236 sets a value of the timing flag to "0" if the first generator 236 generates the other pulse signals P1, P2, P3 and P4. Accordingly, the analyzer 335 of the eyeglass device 300 may determine whether a signal received by the receiver 333 is the reference signal P0 or not. If the value of the timing flag of a signal received by the receiver 333 is "1", the analyzer 335 determines that the signal received by the receiver 333 is the reference signal. If the value of the timing flag of a signal received by the receiver 333 is "0", the analyzer 335 determines that the signal received by the receiver 333 is one of the other pulse signals P1, P2, P3 and P4. If it is determined that the reference signal P0 is received, the analyzer 335 processes the control information (command information) included in the reference signal P0 and the pulse signals P2, P3, P4, P1, as one group, and adjusts control parameters such as the open time period of the optical shutter portion 310, the transmittance and/or response speed, so as to moderate the flicker, which is caused by difference between the video display period and the lighting period of the fluorescent lamp 400. Thus, a viewer may comfortably watch a stereoscopic image.

The lighting frequency information indicates the lighting frequency of the fluorescent lamp 400, which is detected by the detector 239 of the display device 200. In the present embodiment, if the bits of the lighting frequency information are "00", the lighting frequency of the fluorescent lamp 400 is "100 Hz", and if the bits of the lighting frequency information are "01", the lighting frequency of the fluorescent lamp 400 is "120 Hz".

The frame rate information represents the frame rate of the video image displayed on the display portion 230 of the display device 200. In the present embodiment, if the bits of the frame rate information are "00", the frame rate of the video image displayed by the display portion 230 is "96 Hz". If the bits of the frame rate information are "01", the frame rate of the video image displayed by the display portion 230 is "100 Hz". If the bits of the frame rate information are "10", the frame rate of the video image displayed by the display portion 230 is "120 Hz". If the bits of the frame rate information are "11", the frame rate of the video image displayed by the display portion 230 is "144 Hz".

Figure 15:
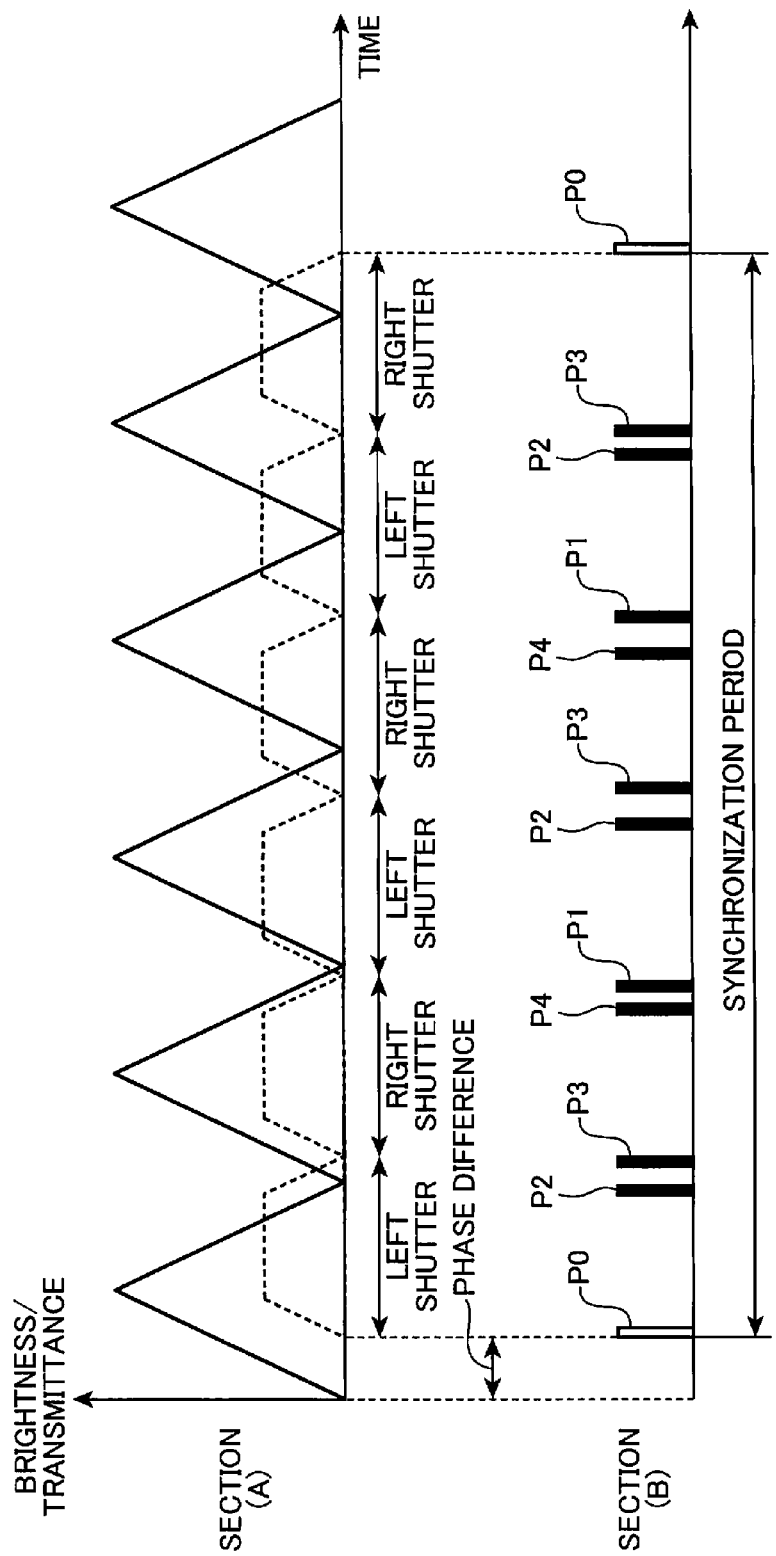
FIG. 15 is a timing chart schematically showing a phase difference between a synchronization period and a lighting period.

FIG. 15 is a timing chart schematically showing a phase difference between the synchronization period and the lighting period. The synchronization signal is further described with reference to FIGS. 1, 3, 4 and 10, and FIGS. 13 to 15.

The reference signal P0 shown in FIG. 13 is simultaneously transmitted with the start of an increase in brightness of the fluorescent lamp 400, whereas transmission of the reference signal P0 shown in FIG. 15 is delayed by a prescribed time period (phase difference) from the start of the increase in brightness of the fluorescent lamp 400. If the phase difference between the lighting period of the fluorescent lamp 400 and the "synchronization period" is always consistent, the phase difference information is not necessary. However, it is likely that the phase difference between the lighting period of the fluorescent lamp 400 and the "synchronization period" varies. Settings for the open time, transmittance and/or response speed of the optical shutter portion 310 to moderate variation in light amount from the fluorescent lamp 400, which is transmitted through the optical shutter portion 310, is dependent on an amplitude of the phase difference. Therefore it is preferable to set operation of the optical shutter portion 310 in terms of the phase difference between the lighting period of the fluorescent lamp 400 and the "synchronization period".

In the present embodiment, the first generator 236 generates a synchronization signal with a reference signal P0 including phase difference information and/or pulse signals P1, P2, P3 and P4. In the present embodiment, the first generator 236 may set information about a phase difference of "0°", "90°", "180°" and "270°", in the synchronization signal. Alternatively, the first generator 236 may set a phase difference of another value in the synchronization signal. If there is a more variety of information about the phase difference which may be set by the first generator 236, a more consistent light amount from the fluorescent lamp 400 is transmitted through the optical shutter portion 310.

The first generator 236 of the display device 200 sets a value of the timing flag to "1" (valid) to generates the reference signal P0. The first generator 236 determines a value of the timing flag to "0" to set up the other pulse signals P1, P2, P3 and P4. The first generator 236 sets control information such as lighting frequency information, frame rate information and phase difference information in the reference information P0 and/or the pulse signals P1, P2, P3, P4. The receiver 233 transmits a synchronization signal including the reference signal P0 and the pulse signals P1, P2, P3, P4, which have been generated by the first generator 236, to the eyeglass device 300.

The receiver 333 of the eyeglass device 300 receives the synchronization signal from the display device 200. The analyzer 335 acquires the control information such as the lighting frequency information, frame rate information and phase difference information from the received synchronization signal. The analyzer 335 defines a pattern of the assistance operation of the optical shutter portion 310 to moderate the flicker on the basis of the control information included in the signals received between the receptions of one reference signal P0 and the subsequent reference signal P0. The shutter controller 338 controls the optical shutter portion 310 in accordance with the pattern defined by the analyzer 335. Thus, it becomes less likely that a viewer perceives flicker. Since the reference signal P0, which is used as a reference of the assistance operation pattern, is identified on the basis of the value of the timing flag and the assistance operation pattern of the eyeglass device 300 is determined on the basis of the reference signal P0, simplified signal processes is achieved for the assistance operation.

The analyzer 335 of the eyeglass device 300 may define the assistance operation of the eyeglass device 300 on the basis of the reference signal P0 and the pulse signals P1, P2, P3 and P4, which are received during the synchronization period. Therefore, even if communication of the synchronization signal is cut off thereafter, the second generator 337 of the eyeglass device 300 may still generate internal signals in accordance with the defined pattern of the assistance operation. Thus, the shutter controller 338 of the eyeglass device 300 may continue to autonomously control the assistance operation of the optical shutter portion 310.

If the receiver 333 of the eyeglass device 300 receives the synchronization signal again, the analyzer 335 may identify the reference signal P0 and the pulse signals P1, P2, P3 P4, on the basis of the value of the timing flag in the signal, which is received by the receiver 333. If the analyzer 335 confirms reception of the reference signal P0, the analyzer 335 interprets a time period from the reception timing of the reference signal P0 until the reception timing of the next reference signal P0 as the synchronization period, and then defines the assistance operation pattern of the eyeglass device 300. Therefore, the opening and closing of the optical shutter portion 310 is rapidly performed in each image frame.

If the reference signal P0 includes information about the lighting frequency, information about the video frame rate and information about the phase difference, the pulse signals P1, P2, P3 and P4 do not have to include information about the lighting frequency, information about the video frame rate and information about the phase difference, which results in a shorter data length of the pulse signals P1, P2, P3 and P4.

According to the methodologies of the present embodiment, the detector 239 of the display device 200 detects the lighting frequency of the fluorescent lamp 400. The first generator 236 generates a synchronization signal including control conditions such as the shutter open time, transmittance and response speed, on the basis of the video frame rate and the lighting frequency of the fluorescent lamp 400. The transmitter 233 transmits the generated synchronization signal to the eyeglass device 300.

The receiver 333 of the eyeglass device 300 receives the synchronization signal from the display device 200. The analyzer 335 defines the assistance operation pattern of the optical shutter portion 310 in accordance with the control information contained in the synchronization signal. The shutter controller 338 controls the assistance operation of the optical shutter portion 310 in accordance with the defined pattern of the assistance operation to present a viewing environment with little flicker to the viewer.

If the first generator 236 generates the reference signal P0 at each "synchronization period", a substantially consistent light amount from the fluorescent lamp 400 is transmitted through the optical shutter portion 310 between video image frames by means of the signals (reference signal P0 and pulse signals P1, P2, P3, P4) transmitted during the "synchronization period". Therefore, flicker is reduced under simplified control methodologies.

The first generator 236 generates a synchronization signal containing control information including information relating to a lighting frequency of the fluorescent lamp 400 which is detected by the detector 239, and information relating to a video frame rate. The transmitter 233 transmits the generated synchronization signal to the eyeglass device 300. The receiver 333 of the eyeglass device 300 receives the synchronization signal. The analyzer 335 analyzes the control information included in the synchronization signal. The shutter controller 338 controls the optical shutter portion 310 in synchronization with frame image display on the basis of the analyzed control information. The reference signal P0 transmitted from the display device 200 is used as a reference of the control of the optical shutter portion 310. Therefore, the eyeglass device 300 may determine the suitable assistance operation of the optical shutter portion 310 for each video frame. The optical shutter portion 310 of the eyeglass device 300 operates in accordance with the suitably defined pattern of the assistance operation, which results in little flicker in a video image to be presented to the viewer.

<Brightness Control for Display Portion>

Figure 16:
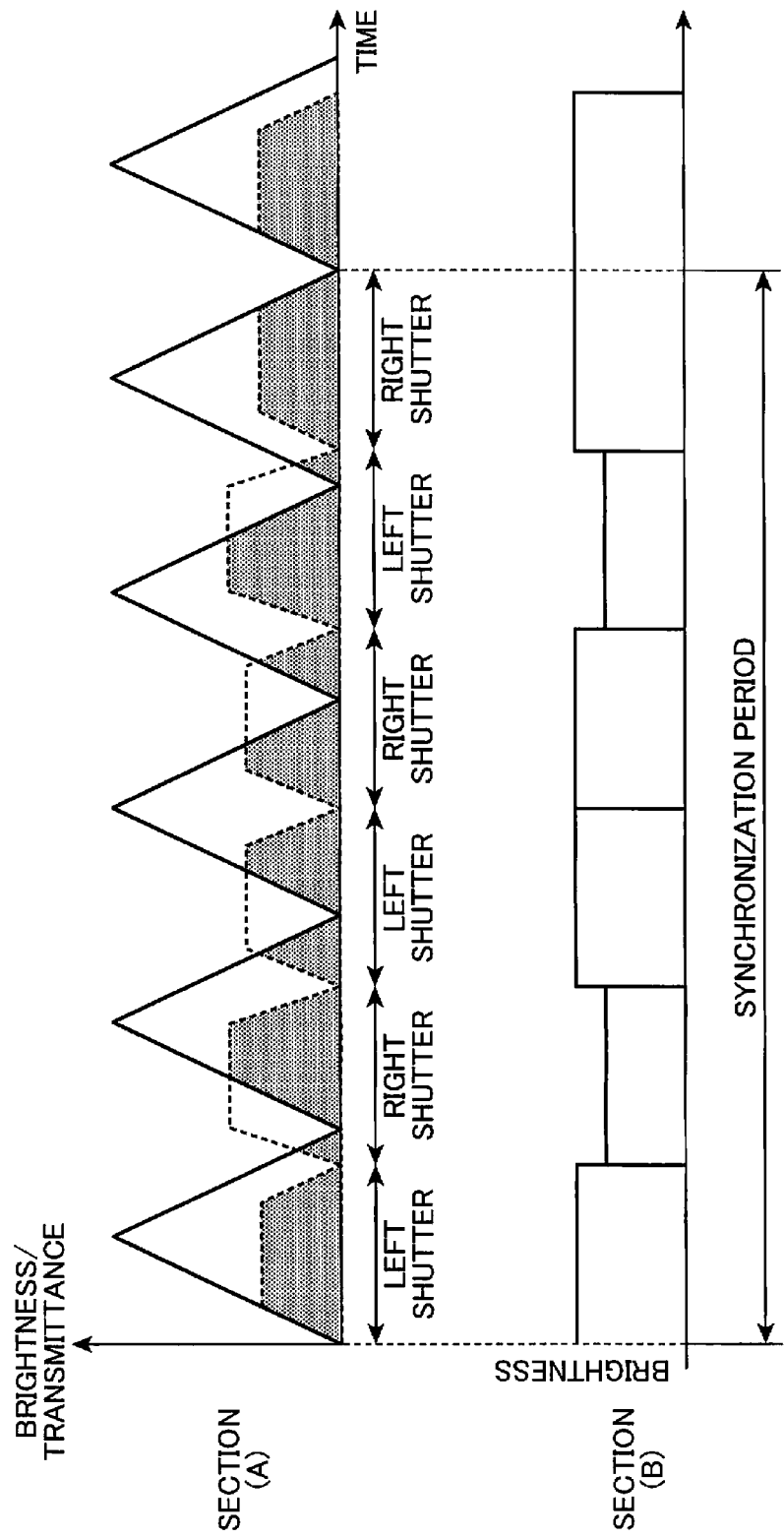
FIG. 16 is a timing chart schematically showing brightness control of the display portion 230 which is carried out in parallel with the transmission of the synchronization signal shown in FIG. 13.

FIG. 16 is a timing chart schematically showing brightness control of the display portion 230, which is carried out in parallel with the transmission of a synchronization signal described in the context of FIG. 13. Section (A) in FIG. 16 is a timing chart similar to section (A) in FIG. 13. Section (B) in FIG. 16 is a timing chart representing brightness variation of the display portion 230. The brightness control for the display portion 230 is described with reference to FIGS. 3, 4, 13 and 16.

As shown in FIG. 16, the display portion 230 reduces brightness of the video image if the left and right shutters 311, 312 allow a large amount of light to pass through. The display portion 230 increases the brightness of the video image, if the left and right shutters 311, 312 allow a small amount of light to pass through. Accordingly, reduced variation in amount of the video image light is transmitted to the viewer's eyes through the optical shutter portion 310. For example, if the display portion 230 is a liquid crystal display, the brightness of the backlight, which illuminates the liquid crystal panel, is increased in synchronization with generation of a signal (reference signal P0 and/or pulse signals P1, P2, P3, P4), which contains information for increasing the transmission light amount through the optical shutter portion 310. The brightness of the backlight, which illuminates the liquid crystal panel, is increased in synchronization with generation of the signal (reference signal P0 and/or pulse signals P1, P2, P3, P4), which contains information for decreasing the transmission light amount of the optical shutter portion 310.

Second Embodiment

Figure 17:
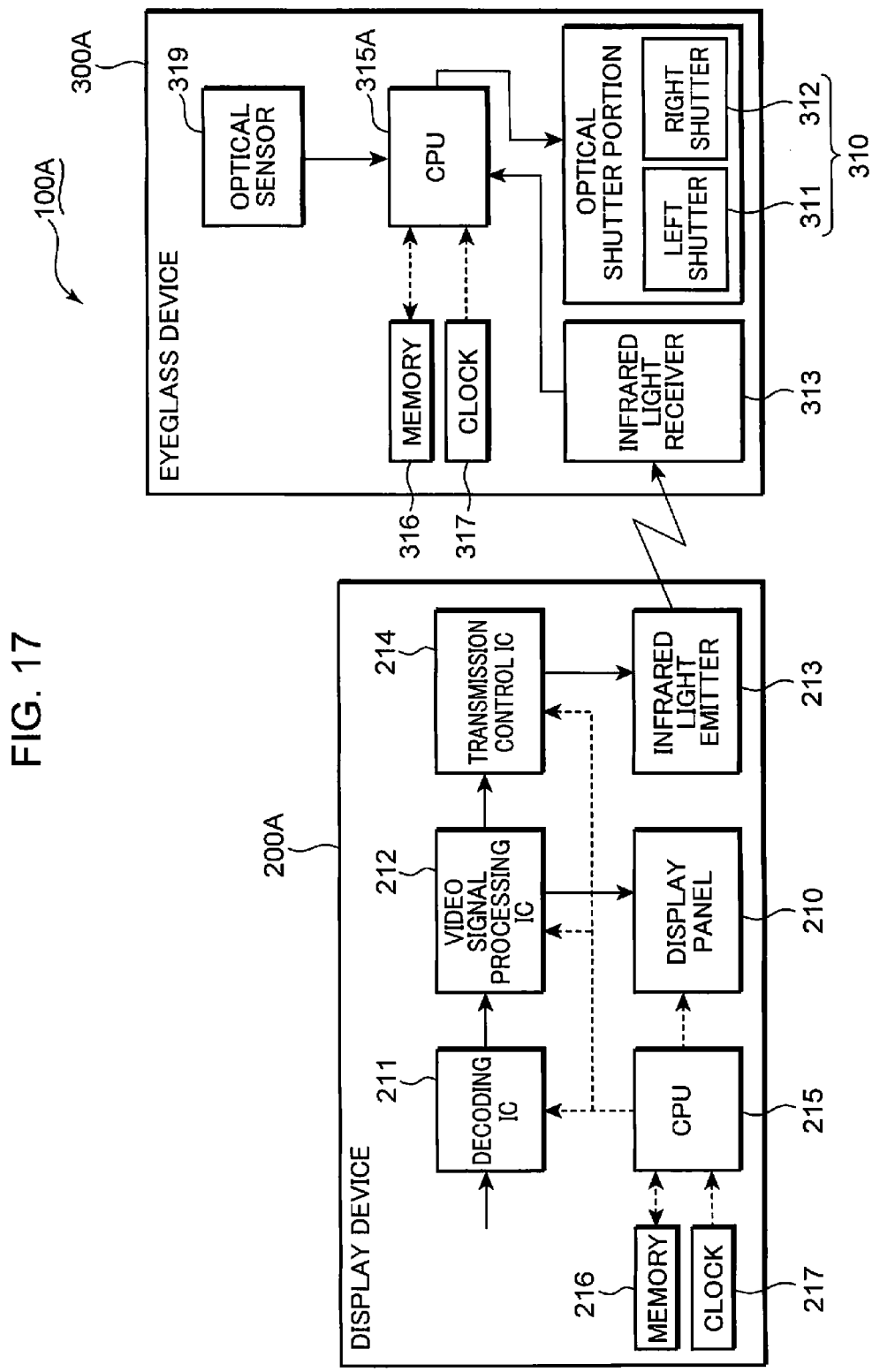
FIG. 17 is a block diagram schematically showing a hardware configuration of a video system according to the second embodiment.

FIG. 17 is a block diagram schematically showing a hardware configuration of a video system according to the second embodiment. Elements which are the same as the first embodiment are labeled with the same reference numerals. Different features from the first embodiment are described with reference to FIGS. 1, 2 and 5, FIGS. 7 to 9 and FIG. 17. The descriptions relating to the first embodiment may be preferably applicable to elements, which are not described below.

The video system 100A comprises a display device 200A which displays a stereoscopic image, and an eyeglass device 300A which performs an assistance operation for assisting in viewing the stereoscopic image.

Like the display device 200 described in the context of the first embodiment, the display device 200A comprises a display panel 210, a decoding IC 211, a video signal processing IC 212, a light emitter 213, a transmission control IC 214, a CPU 215, a memory 216 and a clock 217. Unlike the display device 200 described in the context of the first embodiment, the display device 200A does not comprise a power supply processing circuit 218 or an optical sensor 219. Consequently, the display device 200A transmits a synchronization signal without taking account of blinking of the fluorescent lamp 400, like the descriptions in the context of FIG. 5.

Like the eyeglass device 300 described in the context of the first embodiment, the eyeglass device 300A comprises an optical shutter portion 310, a light receiver 313, a memory 316 and a clock 317. The eyeglass device 300A comprises a CPU 315A and an optical sensor 319. The optical sensor 319 detects the lighting frequency of the fluorescent lamp 400. The CPU 315A controls the optical shutter portion 310 with taking account of the blinking of the fluorescent lamp 400 on the basis of the lighting frequency of the fluorescent lamp 400 detected by the optical sensor 319. Thus, a viewer may watch a stereoscopic image with little flicker. The control of the optical shutter portion 310 based on the output signal of the optical sensor 319 follows the first to third control methodologies described in the context of FIGS. 7 to 9.

Figure 18:
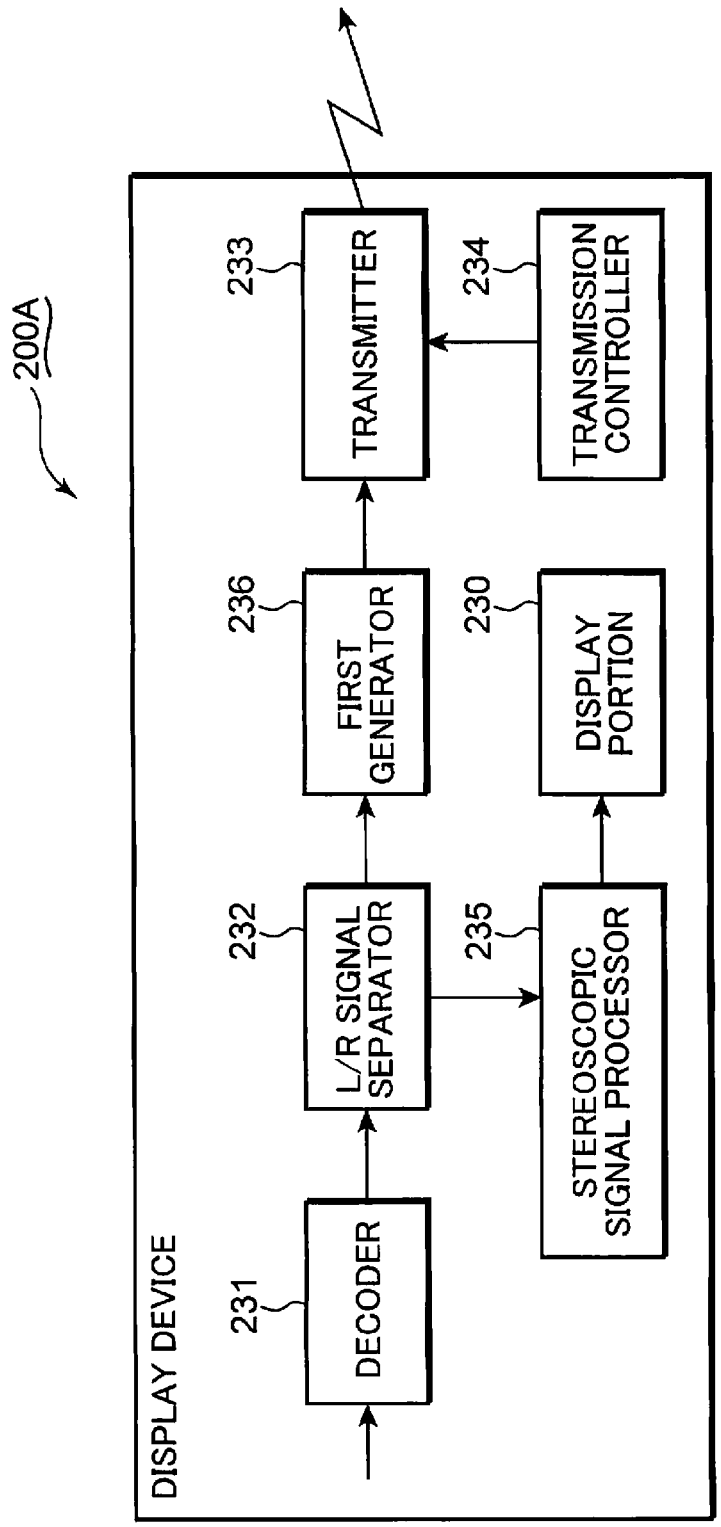
FIG. 18 is a block diagram schematically showing a functional configuration of a display device in the video system shown in FIG. 17.
Figure 19:
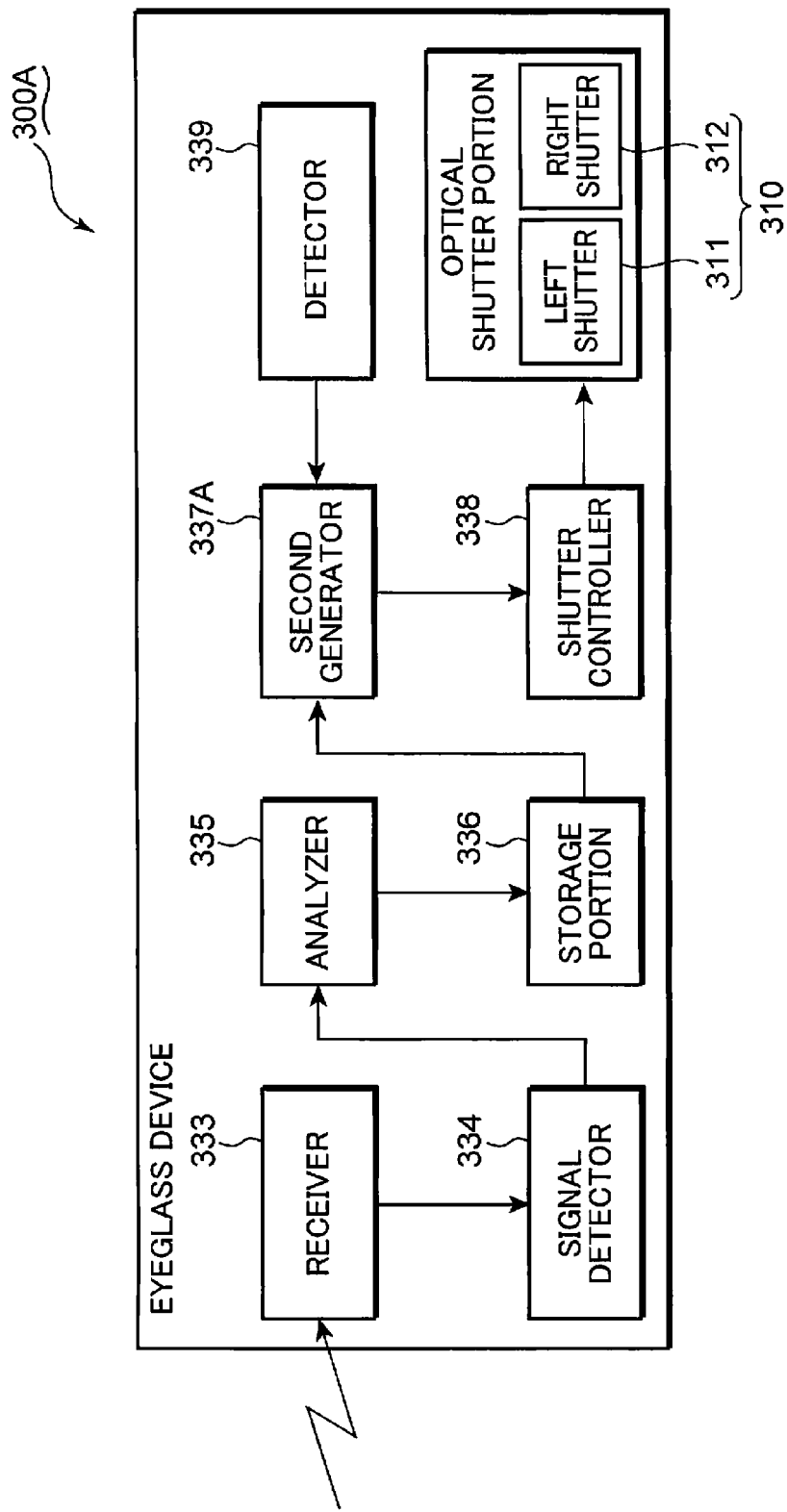
FIG. 19 is a block diagram schematically showing a functional configuration of an eyeglass device in the video system shown in FIG. 17.

FIG. 18 is a block diagram schematically showing a functional configuration of the display device 200A. The display device 200A is described with reference to FIGS. 3, 5 and 18.

Like the display device 200 described in the context of the first embodiment, the display device 200A comprises a decoder 231, an L/R signal separator 232, a stereoscopic signal processor 235, a display portion 230, a first generator 236, a transmission controller 234, and a transmitter 233. Unlike the display device 200 described in the context of the first embodiment, the display device 200A does not comprise a detector 239. Consequently, the display device 200A transmits a synchronization signal without taking account of the blinking of the fluorescent lamp 400, like the descriptions in the context of FIG. 5.

FIG. 18 is a block diagram schematically showing a functional configuration of the eyeglass device 300A. The eyeglass device 300A is described with reference to FIGS. 1, 4 and 5, FIGS. 7 to 9 and FIGS. 17 and 19.

Like the eyeglass device 300 described in the context of the first embodiment, the eyeglass device 300A comprises a receiver 333, a signal detector 334, an analyzer 335, a storage portion 336, a shutter controller 338 and an optical shutter portion 310. The eyeglass device 300A further comprises a second generator 337A and a detector 339. The second generator 337A corresponds to the CPU 315A in the hardware configuration shown in FIG. 17. The detector 339 corresponds to the optical sensor 319 in the hardware configuration shown in FIG. 17.

The analyzer 335 analyzes the synchronization information for synchronizing the opening and closing operations of the left and right shutters 311, 312 with display of video frame images, on the basis of the reception interval of the pulse signals LO, LC, RO, RC (see FIG. 5), and then stores the information in the storage portion 336. The detector 339 detects the lighting frequency of the fluorescent lamp 400. The second generator 337A generates internal information, which defines the assistance operation pattern of the optical shutter portion 310, on the basis of synchronization information (information relating to the video frame rate), information about the lighting frequency of the fluorescent lamp 400, and information relating to the phase difference between the video display switching period and the blinking of the fluorescent lamp 400. The internal signal is generated so that reduced variation in light amount from the fluorescent lamp 400 is transmitted through the optical shutter portion 310.

The second generator 337A acquires information relating to the lighting frequency of the fluorescent lamp 400 from the detector 339. The second generator 337A acquires information relating to the video frame rate on the basis of the reception interval of the pulse signals contained in the synchronization signal transmitted by the display device 200 (for example, the reception interval between the pulse signal LO for opening the left shutter 311, the pulse signal LC for opening the left shutter 311, the pulse signal RO for opening the right shutter 312 and the pulse signal RC for closing the right shutter 312). The analyzer 335 may calculate the video frame rate on the basis of the reception interval of the pulse signals. The second generator 337A may acquire information relating to the video frame rate via the storage portion 336.

Alternatively, the synchronization signal transmitted from the display device 200A may include information relating to the video frame rate. The analyzer 335 may extract the information relating to the video frame rate from the synchronization signal received by the receiver 333, and then record the information in the storage portion 336.

The second generator 337A may calculate the aforementioned phase difference on the basis of the lighting frequency of the fluorescent lamp 400 detected by the detector 339 and the calculated or acquired video frame rate.

Like the methodologies of the first embodiment, the eyeglass device 300A may identify the flicker pattern, which is determined by the blinking of the fluorescent lamp 400, and the video frame rate. Therefore, the second generator 337A generates an internal signal so that the open time periods, transmittance and response speeds of the left and right shutters 311, 312, and the combination of these, are adjusted in accordance with the first to third control methodologies described in the context of FIGS. 7 to 9.

The shutter controller 338 controls the optical shutter portion 310 on the basis of the generated internal signal.

A viewer wearing the eyeglass device 300A may watch a stereoscopic video image with little flicker. Since the eyeglass device 300A detects the lighting frequency of the fluorescent lamp 400, it becomes likely that the eyeglass device 300A alone moderates the flicker. Consequently, even unless the synchronization signal transmitted from the display device 200A contains control information for the optical shutter portion 310 (information relating to the transmittance and the response speed), the eyeglass device 300A may still appropriately moderate flicker to present the viewer with a quality stereoscopic image.

According to the second embodiment, the synchronization signal transmitted from the display device 200A to the eyeglass device 300A does not contain control information such as the shutter open time, transmittance or response speed. Therefore it is likely that a synchronization signal to be transmitted has a relatively small information volume.

<Various Transmission Pattern of Reference Signal>

Figure 20:
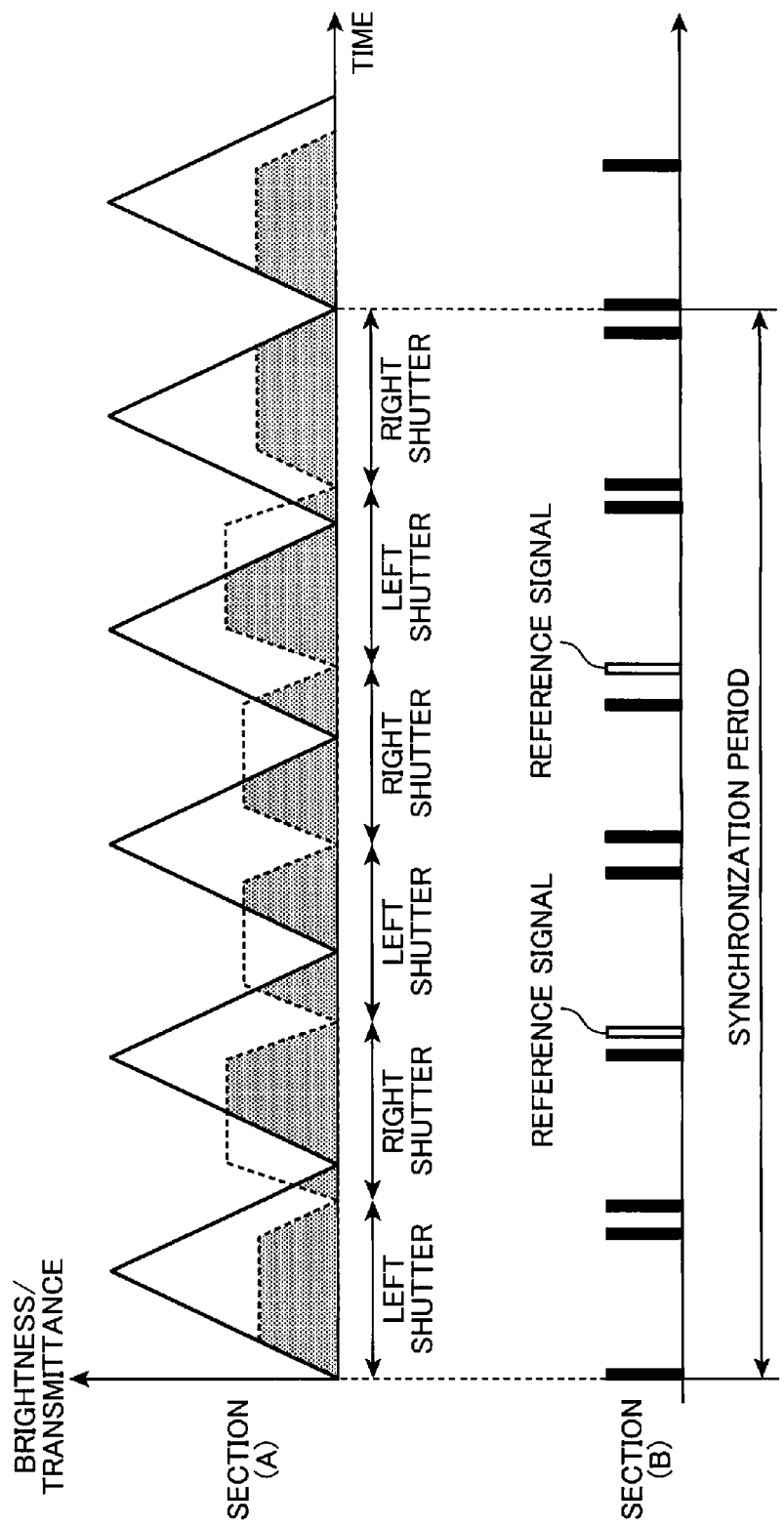
FIG. 20 is a timing chart schematically showing another transmission pattern of a reference signal.

FIG. 20 is a timing chart schematically showing another transmission pattern of a reference signal. Section (A) in FIG. 20 is a graph schematically showing a relationship between variation in transmission light amount permitted by the optical shutter portion 310 and the blinking of the fluorescent lamp 400. In the graph shown in section (A) of FIG. 20, the dotted line indicates the variation in transmission light amount permitted by the optical shutter portion 310. The solid line indicates brightness variation of the fluorescent lamp 400. Section (B) in FIG. 20 is a timing chart schematically showing a transmission pattern of a synchronization signal. The other transmission pattern of the reference signal is described with reference to FIGS. 13 and 20.

The reference signal described in the context of the first embodiment is transmitted in synchronization with the start of the synchronization period (see FIG. 13). Alternatively, as shown in FIG. 20, the reference signals may be transmitted at different timings within the synchronization period. The reference signals shown in FIG. 20 correspond to the start of the second cycle and the third cycle of the video frame display. Preferably, the eyeglass device independently identifies these reference signals.

As a result of transmitting a few reference signals which are independently identified within one synchronization period, if communication of the synchronization signal between the eyeglass device and the display device is temporarily interrupted and then restarted, it is rapidly determined which part of the synchronization period adjustment between the received synchronization signal and the corresponding internal signal starts from.

The aforementioned embodiments mainly comprise the following configurations.

A controller for controlling an eyeglass device which performs an assistance operation for assisting in stereoscopically viewing a video according to one aspect of the aforementioned embodiments includes: a first acquisition portion configured to acquire first frequency information relating to a display frequency of frame images of the video; a second acquisition portion configured to acquire second frequency information relating to an environmental factor which periodically varies in an environment where the video is viewed; and a generator configured to generate a reference signal for adapting the assistance operation of the eyeglass device to display of the frame image and periodic variation of the environmental factor based on the first frequency information and the second frequency information.

According to the aforementioned configuration, the controller controls the eyeglass device which performs the assistance operation for assisting in stereoscopically viewing the video. The first acquisition portion acquires the first frequency information, which is related to the display frequency of the frame image of the video. The second acquisition portion acquires second frequency information relating to the environmental factor which periodically varies in the environment where the video is viewed. The generator generates a reference signal for adapting the assistance operation of the eyeglass device to the display of frame image and the periodic variation of the environmental factors. Since the controller adapts the assistance operation of the eyeglass device to the display of the frame image and the periodic variation in the environmental factors, a viewer may comfortably watch the video by means of the assistance operation of the eyeglass device which is adapted to the environment where the video is viewed.

In the aforementioned configuration, preferably, the second frequency information includes information relating to a blinking frequency of an illumination light source configured to illuminate a space where the video is viewed.

According to the aforementioned configuration, since the second frequency information includes information relating to the blinking frequency of the illumination light source configured to illuminate the space where the video is viewed, the eyeglass device may perform the assistance operation, which corresponds to the blinking of the illumination light source, under the control of the controller.

In the aforementioned configuration, preferably, the controller further comprises a transmitter configured to transmit the reference signal, wherein the transmitter transmits the reference signal at a transmission period which is longer than a display period of the frame image and a blinking period of the illumination light source, the generator generates a control signal which causes the eyeglass device to perform the assistance operation so that a viewer viewing the video perceives reduced brightness variation of the illumination light source; and the transmitter transmits the control signal within the transmission period of the reference signal.

According to the aforementioned configuration, the controller further comprises the transmitter configured to transmit the reference signal. The transmitter transmits the reference signal at a transmission period which is longer than the display period of the frame image and the blinking period of the illumination light source. The generator generates the control signal which causes the eyeglass device to perform the assistance operation so that a viewer viewing the video perceives reduced brightness variation of the illumination light source. The transmitter transmits the control signal within the transmission period of the reference signal. Since the eyeglass device performs the assistance operation so as to reduce the brightness variation of the illumination light source, which is perceived by the viewer viewing the video, it becomes less likely that the viewer perceives the blinking of the illumination light source. Therefore the viewer may comfortably watch the video.

In the aforementioned configuration, preferably, the transmission period of the reference signal is as long as a common multiple of the display period of the frame image and the blinking period of the illumination light source.

According to the aforementioned configuration, since the transmission period of the reference signal is as long as a common multiple of the display period of the frame image and the blinking period of the illumination light source, the controller may appropriately adapt the assistance operation of the eyeglass device to the display of the frame image and the blinking of the illumination light source.

In the aforementioned configuration, preferably, the transmission period of the reference signal is as long as a least common multiple of the display period of the frame image and the blinking period of the illumination light source.

According to the aforementioned configuration, since the transmission period of the reference signal is as long as a common multiple of the display period of the frame image and the blinking period of the illumination light source, the controller may precisely adapt the assistance operation of the eyeglass device to the display of the frame image and the blinking of the illumination light source.

In the aforementioned configuration, preferably, the reference signal includes at least one of first command information for increasing a transmission light amount to a left eye of the viewer, second command information for decreasing the transmission light amount to the left eye, third command information for increasing a transmission light amount to a right eye of the viewer, and fourth command information for decreasing the transmission light amount to the right eye.

According to the aforementioned configuration, since the reference signal includes at least one of the first command information for increasing the transmission light amount to the left eye of the viewer, the second command information for decreasing the transmission light amount to the left eye, the third command information for increasing the transmission light amount to the right eye of the viewer, and the fourth command information for decreasing the transmission light amount to the right eye, the eyeglass device may perform the assistance operation on the basis of the reference signal.

In the aforementioned configuration, preferably, the transmission period of the reference signal includes the first transmission period and the second transmission period following the first transmission period, the generator generates the control signal including at least one of the first command information for increasing the transmission light amount to the left eye of the viewer, the second command information for decreasing the transmission light amount to the left eye, the third command information for increasing the transmission light amount to the right eye of the viewer, and the fourth command information for reducing the transmission light amount to the right eye to define a pattern of the assistance operation of the eyeglass device in the first transmission period of the reference signal; and the transmitter transmits the control signal such that the eyeglass device performs the assistance operation during the second transmission period according to a same pattern as the pattern of the assistance operation defined for the first transmission period.

According to the aforementioned configuration, the generator generates a control signal which includes at least one of the first command information for increasing the transmission light amount to the left eye of the viewer, the second command information for decreasing the transmission light amount to the left eye, the third command information for increasing the transmission light amount to the right eye of the viewer, and the fourth command information for decreasing the transmission light amount to the right eye to define a pattern of the assistance operation of the eyeglass device in the first transmission period of the reference signal. In the second transmission period which follows the first transmission period, the transmitter transmits the control signal so that the eyeglass device performs the assistance operation according to the same pattern as the pattern of the assistance operation defined for the first transmission period, which simplifies the generation of the control signal and the signal processing relating to transmission.

In the aforementioned configuration, preferably, the generator defines the pattern of the assistance operation of the eyeglass device by adjusting an interval between a timing of increasing the transmission light amount and a timing of decreasing the transmission light amount so that the viewer perceives the reduced brightness variation of the illumination light source.

According to the aforementioned configuration, the generator defines the pattern of the assistance operation of the eyeglass device by adjusting the interval between the timings of increasing and decreasing the transmission light amount so that the viewer perceives the reduced brightness variation of the illumination light source. Therefore, it becomes less likely that the viewer perceives blinking of the illumination light source. Therefore the viewer may comfortably view the video.

In the aforementioned configuration, preferably, the control signal includes light amount information relating to the transmission light amount permitted by the eyeglass device; and the generator defines the light amount information so that the viewer perceives the reduced brightness variation of the illumination light source.

According to the aforementioned configuration, the control signal includes light amount information relating to the transmission light amount permitted by the eyeglass device. Since the generator defines the light amount information so that the viewer perceives the reduced brightness variation of the illumination light source. Therefore it becomes less likely that the viewer perceives the blinking of the illumination light source. Therefore the viewer may comfortably watch the video.

The display device according to another aspect of the aforementioned embodiments comprises: a display portion configured to display a video which is stereoscopically perceived; and a controller configured to control an eyeglass device which performs an assistance operation for assisting in viewing the video, wherein the controller includes: a first acquisition portion configured to acquire first frequency information relating to a display frequency of frame images of the video; a second acquisition portion configured to acquire second frequency information relating to an environmental factor that periodically varies in an environment where the video is viewed; and a generator configured to generate a reference signal for adapting the assistance operation of the eyeglass device to display of the frame image and periodic variation of the environmental factor based on the first frequency information and the second frequency information.

According to the aforementioned configuration, the display device includes the display portion configured to display the video which is stereoscopically perceived; and the controller configured to control the eyeglass device which performs the assistance operation for assisting in viewing the video. The first acquisition portion acquires the first frequency information relating to the display frequency of the frame image of the video. The second acquisition portion acquires the second frequency information relating to the environmental factor which periodically varies in the environment where the video is viewed. The generator generates the reference signal for adapting the assistance operation of the eyeglass device to the display of frame image and the periodic variation of the environmental factor. Since the controller adapts the assistance operation of the eyeglass device to the display of the frame image and the periodic variation in the environmental factor, the viewer may comfortably watch the video by means of the assistance operation of the eyeglass device which is adapted to the environment where the video is viewed.

An eyeglass device which performs an assistance operation for assisting in stereoscopically viewing a video according to yet another aspect of the aforementioned embodiments comprises: a receiver configured to receive a reference signal generated based on first frequency information relating to a display frequency of frame images of the video and second frequency information relating to an environmental factor which periodically varies in an environment where the video is viewed; and an optical filter portion configured to perform the assistance operation adapted to display of the frame image and periodic variation of the environmental factor in response to the reference signal.

According to the aforementioned configuration, the eyeglass device performs the assistance operation for assisting in stereoscopically viewing the video. The receiver receives the reference signal which is generated on the basis of the first frequency information relating to the display frequency of the frame image of the video and the second frequency information relating to the environmental factor which periodically varies in the environment where the video is viewed. Since the optical filter portion executes the assistance operation which is adapted to the display of the frame image and the periodic variation in the environmental factor, the viewer may comfortably watch the video by means of the assistance operation of the eyeglass device which is adapted to the environment where the video is viewed.

In the aforementioned configuration, preferably, the eyeglass device further comprises an analyzer configured to analyze a signal received by the receiver, wherein the second frequency information includes information relating to a blinking frequency of an illumination light source which illuminates a space where the video is viewed, the receiver receives the reference signal which is transmitted at a transmission period longer than a display period of the frame image and a blinking period of the illumination light source, and a control signal for causing the optical filter portion to perform the assistance operation so that a viewer perceives reduced brightness variation of the illumination light source, the analyzer analyzes a pattern of the assistance operation in response to the reference signal and the control signal, which is received in the transmission period; and the optical filter portion performs the assistance operation based on an analysis result of the pattern.

According to the aforementioned configuration, the eyeglass device further comprises the analyzer configured to analyze the signal received by the receiver. The second frequency information includes the information relating to the blinking frequency of the illumination light source configured to illuminate the space where the video is viewed. The receiver receives the reference signal which is transmitted at the transmission period longer than the display period of the frame image and the blinking period of the illumination light source; and the control signal for causing the optical filter portion to perform the assistance operation so that a viewer perceives reduced brightness variation of the illumination light source. The analyzer analyzes a pattern of the assistance operation on the basis of the reference signal and the control signal received in the transmission period. The optical filter portion performs the assistance operation on the basis of the analysis result of the pattern, so that it becomes less likely that the viewer perceives blinking of the illumination light source. Therefore the viewer may comfortably watch the video.

In the aforementioned configuration, preferably, the optical filter portion includes a left filter, which increases and decreases a transmission light amount to a left eye, and a right filter, which increases and decreases a transmission light amount to a right eye; and the control signal includes information relating to a response speed of the left and right filters.

According to the aforementioned configuration, the optical filter portion includes the left filter configured to increase and decrease the transmission light amount to the left eye, and the right filter configured to increase and decrease the transmission light amount to the right eye. Since the control signal includes information relating to the response speed of the left and right filters, the optical filter portion adjusts the response speed of the left and right filters in response to the blinking frequency of the illumination light source to perform the assistance operation. Therefore, it becomes less likely that the viewer perceives any blinking of the illumination light source. Accordingly the viewer may comfortably view the video.

The video system according to yet another aspect of the aforementioned embodiments comprises: a display device configured to display a video which is stereoscopically perceived; and an eyeglass device configured to perform an assistance operation for assisting in viewing the video, wherein the display device includes: a display portion configured to display the video; and a controller configured to control the eyeglass device, the controller includes: a first acquisition portion configured to acquire first frequency information relating to a display frequency of frame images of the video; a second acquisition portion configured to acquire second frequency information relating to an environmental factor which periodically varies in an environment where the video is viewed; and a generator configured to generate a reference signal for adapting the assistance operation of the eyeglass device to display of the frame image and periodic variation of the environmental factor based on the first frequency information and the second frequency information; and the eyeglass device comprises: a receiver configured to receive the reference signal; and an optical filter portion configured to perform the assistance operation adapted to the display of the frame image and the periodic variation of the environmental factor in response to the reference signal.

According to the aforementioned configuration, the display device displays the video which may be stereoscopically perceived. The eyeglass device performs the assistance operation for assisting in viewing the video. The first acquisition portion of the display device acquires the first frequency information relating to the display frequency of the frame image of the video. The second acquisition portion acquires the second frequency information relating to the environmental factor which periodically varies in the environment where the video is viewed. The generator generates the reference signal for adapting the assistance operation of the eyeglass device with the display of the frame image and the periodic variation of the environmental factor. The receiver of the eyeglass device receives the reference signal. The optical filter portion executes the assistance operation which is adapted to the display of the frame image and the periodic variation in the environmental factor, so that the viewer may comfortably watch the video by means of the assistance operation of the eyeglass device which is adapted to the environment where the video is viewed.

In the aforementioned configuration, preferably, the second frequency information includes information relating to a blinking frequency of an illumination light source configured to illuminate a space where the video is viewed, the generator generates a control signal which causes the eyeglass device to perform the assistance operation so that a viewer viewing the video perceives reduced brightness variation of the illumination light source, the receiver receives the control signal, the optical filter portion increases or decreases a transmission light amount to an eye of the viewer in response to the reference signal and the control signal, and the display portion adjusts a brightness of the video so as to reduce variation in a light amount from the video which is transmitted through the optical filter portion.

According to the aforementioned configuration, the second frequency information includes information relating to the blinking frequency of the illumination light source configured to illuminate the space where the video is viewed. The generator generates the control signal which causes the eyeglass device to perform the assistance operation so that a viewer viewing the video perceives reduced brightness variation of the illumination light source. The receiver receives the control signal. The optical filter portion increases or decreases the transmission light amount to the eye of the viewer on the basis of the reference signal and the control signal. Since the display portion adjusts the brightness of the video so as to reduce variation in light amount from the video which is transmitted through the optical filter portion, it becomes less likely that the viewer perceives any brightness variation of the video, even if the eyeglass device performs the assistance operation adapted to the blinking of the illumination light source. Therefore, the video viewing environment becomes comfortable.

INDUSTRIAL APPLICABILITY

The methodologies of the aforementioned embodiments may be suitably applied to a display device such as a television device, an eyeglass device which assists in viewing a video displayed on the display device, and a video system comprising the display device and the eyeglass device.

The invention claimed is:
1. A controller for controlling an eyeglass device which performs an assistance operation for assisting in stereoscopically viewing a video, comprising:
   a first acquisition portion configured to acquire first frequency information relating to a display frequency of frame images of the video;
   a second acquisition portion configured to acquire second frequency information relating to an environmental factor which periodically varies in an environment where the video is viewed;

a generator configured to generate a reference signal for adapting the assistance operation of the eyeglass device to display of the frame image and to periodic variation of the environmental factor based on the first frequency information and the second frequency information; and a transmitter configured to transmit the reference signal, wherein the transmitter transmits the reference signal at a transmission period which is longer than a display period of the frame image and which is longer than a blinking period of an illumination light source configured to illuminate a space where the video is viewed, and wherein the transmission period is a least common multiple of the display period of the frame image and the blinking period of the illumination light source.

2. The controller according to claim 1, wherein the second frequency information includes information relating to a blinking frequency of the illumination light source.

3. The controller according to claim 2, wherein the generator generates a control signal which causes the eyeglass device to perform the assistance operation so that a viewer viewing the video perceives reduced brightness variation of the illumination light source; and the transmitter transmits the control signal within the transmission period of the reference signal.

4. The controller according to claim 3, wherein the reference signal includes at least one of first command information for increasing a transmission light amount to a left eye of the viewer, second command information for decreasing the transmission light amount to the left eye, third command information for increasing a transmission light amount to a right eye of the viewer, and fourth command information for decreasing the transmission light amount to the right eye.

5. The controller according to claim 4, wherein the transmission period of the reference signal includes a first transmission period and a second transmission period following the first transmission period, the generator generates the control signal including at least one of the first command information for increasing the transmission light amount to the left eye of the viewer, the second command information for decreasing the transmission light amount to the left eye, the third command information for increasing the transmission light amount to the right eye of the viewer, and the fourth command information for reducing the transmission light amount to the right eye to define a pattern of the assistance operation of the eyeglass device in the first transmission period of the reference signal; and the transmitter transmits the control signal such that the eyeglass device performs the assistance operation during the second transmission period according to a same pattern as the pattern of the assistance operation defined for the first transmission period.

6. The controller according to claim 5, wherein the generator defining the pattern of the assistance operation of the eyeglass device adjusts an interval between a timing of increasing the transmission light amount and a timing of decreasing the transmission light amount so that the viewer perceives the reduced brightness variation of the illumination light source.

7. A controller for controlling an eyeglass device which performs an assistance operation for assisting in stereoscopically viewing a video, comprising:

a first acquisition portion configured to acquire first frequency information relating to a display frequency of frame images of the video;

a second acquisition portion configured to acquire second frequency information relating to an environmental factor which periodically varies in an environment where the video is viewed;

a generator configured to generate a reference signal for adapting the assistance operation of the eyeglass device to display of the frame image and to periodic variation of the environmental factor based on the first frequency information and the second frequency information; and a transmitter configured to transmit the reference signal at a transmission period which is longer than a display period of the frame image and a blinking period of the illumination light source configured to illuminate a space where the video is viewed, wherein the transmission period of the reference signal includes a first transmission period and a second transmission period following the first transmission period, wherein the second frequency information includes information relating to a blinking frequency of the illumination light source;

wherein the generator generates a control signal which causes the eyeglass device to perform the assistance operation so that a viewer viewing the video perceives reduced brightness variation of the illumination light source;

wherein the transmitter transmits the control signal within the transmission period of the reference signal;

wherein the reference signal includes at least one of first command information for increasing a transmission light amount to a left eye of the viewer, second command information for decreasing the transmission light amount to the left eye, third command information for increasing a transmission light amount to a right eye of the viewer, and fourth command information for decreasing the transmission light amount to the right eye;

wherein the control signal includes light amount information relating to the transmission light amount permitted by the eyeglass device; and wherein the generator defines the light amount information so that the viewer perceives the reduced brightness variation of the illumination light source.

8. A display device comprising:

a display portion configured to display a video which is stereoscopically perceived; and a controller configured to control an eyeglass device which performs an assistance operation for assisting in viewing the video, wherein the controller includes:

(i) a first acquisition portion configured to acquire first frequency information relating to a display frequency of frame images of the video;

(ii) a second acquisition portion configured to acquire second frequency information relating to an environmental factor that periodically varies in an environment where the video is viewed;

(iii) a generator configured to generate a reference signal for adapting the assistance operation of the eyeglass device to display of the frame image and to periodic variation of the environmental factor based on the first frequency information and the second frequency information; and (iv) a transmitter configured to transmit the reference signal, wherein the transmitter transmits the reference signal at a transmission period which is longer than a display period of the frame image and which is longer than a blinking period of an illumination light source configured to illuminate a space where the video is viewed, and wherein the transmission period is a least common multiple of the display period of the frame image and the blinking period of the illumination light source.

9. An eyeglass device which performs an assistance operation for assisting in stereoscopically viewing a video comprising:

a receiver configured to receive a reference signal generated based on first frequency information relating to a display frequency of frame images of the video and second frequency information relating to an environmental factor which periodically varies in an environment where the video is viewed; and an optical filter portion configured to perform the assistance operation adapted to display of the frame image and to periodic variation of the environmental factor in response to the reference signal, wherein the receiver receives the reference signal which is transmitted at a transmission period longer than a display period of the frame image and a blinking period of an illumination light source configured to illuminate a space where the video is viewed, and wherein the transmission period is a least common multiple of the display period of the frame image and the blinking period of the illumination light source.

10. The eyeglass device according to claim 9 further comprising an analyzer configured to analyze a signal received by the receiver, wherein the second frequency information includes information relating to a blinking frequency of the illumination light source, the receiver receives a control signal for causing the optical filter portion to perform the assistance operation so that a viewer perceives reduced brightness variation of the illumination light source, the analyzer analyzes a pattern of the assistance operation in response to the reference signal and the control signal which is received in the transmission period; and the optical filter portion performs the assistance operation based on an analysis result of the pattern.

11. The eyeglass device according to claim 10, wherein the optical filter portion includes a left filter, which increases and decreases a transmission light amount to a left eye, and a right filter, which increases and decreases a transmission light amount to a right eye; and the control signal includes information relating to a response speed of the left and right filters.

12. A video system comprising:

a display device configured to display a video which is stereoscopically perceived; and an eyeglass device configured to perform an assistance operation for assisting in viewing the video, wherein the display device includes:

(i) a display portion configured to display the video; and (ii) a controller configured to control the eyeglass device, the controller includes:

(iii) a first acquisition portion configured to acquire first frequency information relating to a display frequency of frame images of the video;

(iv) a second acquisition portion configured to acquire second frequency information relating to an environmental factor which periodically varies in an environment where the video is viewed;

(v) a generator configured to generate a reference signal for adapting the assistance operation of the eyeglass device to display of the frame image and to periodic variation of the environmental factor based on the first frequency information and the second frequency information; and (vi) a transmitter configured to transmit the reference signal;

wherein the transmitter transmits the reference signal at a transmission period which is longer than a display period of the frame image and which is longer than a blinking period of an illumination light source configured to illuminate a space where the video is viewed, wherein the transmission period is a least common multiple of the display period of the frame image and the blinking period of the illumination light source, wherein the eyeglass device includes:

a receiver configured to receive the reference signal; and an optical filter portion configured to perform the assistance operation adapted to the display of the frame image and the periodic variation of the environmental factor in response to the reference signal.

13. The video system according to claim 12, wherein the second frequency information includes information relating to a blinking frequency of the illumination light source, the generator generates a control signal which causes the eyeglass device to perform the assistance operation so that a viewer viewing the video perceives reduced brightness variation of the illumination light source, the receiver receives the control signal, the optical filter portion increases or decreases a transmission light amount to an eye of the viewer in response to the reference signal and the control signal, and the display portion adjusts a brightness of the video so as to reduce variation in a light amount from the video which is transmitted through the optical filter portion.

* * * * *